United States Patent
Allen et al.

(10) Patent No.: US 11,134,013 B1
(45) Date of Patent: Sep. 28, 2021

(54) CLOUD BURSTING TECHNOLOGIES

(71) Applicant: NODUS Software Solutions LLC, Naples, FL (US)

(72) Inventors: Arthur L. Allen, Naples, FL (US); Bradley T. Serbu, Naples, FL (US)

(73) Assignee: NODUS Software Solutions LLC, Naples, FL (US)

( * ) Notice: Subject to any disclaimer, the term of this patent is extended or adjusted under 35 U.S.C. 154(b) by 247 days.

(21) Appl. No.: 15/994,501

(22) Filed: May 31, 2018

(51) Int. Cl.
| | | |
|---|---|---|
| *H04L 12/803* | (2013.01) | |
| *H04L 12/24* | (2006.01) | |
| *H04L 29/08* | (2006.01) | |

(52) U.S. Cl.
CPC ........ *H04L 47/125* (2013.01); *H04L 41/0806* (2013.01); *H04L 67/1097* (2013.01)

(58) Field of Classification Search
CPC .............. H04L 47/125; H04L 67/1097; H04L 41/0806
See application file for complete search history.

(56) References Cited

U.S. PATENT DOCUMENTS

| | | | |
|---|---|---|---|
| 9,935,829 B1 | 4/2018 | Miller | |
| 10,003,550 B1 | 6/2018 | Babcock | |
| 10,877,796 B1 | 12/2020 | Kinney, Jr. | |
| 2014/0280961 A1* | 9/2014 | Martinez | H04L 41/5054 709/226 |
| 2016/0048408 A1* | 2/2016 | Madhu | G06F 11/2097 718/1 |
| 2016/0105321 A1* | 4/2016 | Thakkar | H04L 41/0853 709/220 |
| 2018/0227240 A1 | 8/2018 | Liu | |
| 2019/0147089 A1 | 5/2019 | Megahed | |
| 2019/0312795 A1* | 10/2019 | Karve | H04L 41/5054 |

* cited by examiner

*Primary Examiner* — Austin J Moreau

(57) ABSTRACT

In some examples, a multi-cloud bursting service generates cloud agnostic burst templates for bursting workload environments on different clouds, each of the cloud agnostic burst templates defining a stack for a workload environment and tasks for provisioning cloud resources and deploying, on the cloud resources, the workload environment associated with the stack, the stack including applications, libraries, services, data, and/or an operating system. The multi-cloud bursting service can receive, from a local compute environment, a request to burst the workload environment onto a selected cloud and, based on a cloud agnostic burst template identified for the request, provision the cloud resources from the selected cloud and deploy the workload environment on the cloud resources from the selected cloud.

20 Claims, 21 Drawing Sheets

STACK_SCHEMA 500

| Field Name | Description |
|---|---|
| 502 name | The name of the stack. This should be unique across all stack definitions. |
| 504 version | The user-defined version of the stack. If the stack is an application or service package, then the version of the package is recommended. |
| 506 os | The os field is used to specify the base operating system image for the stack. Base images for each cloud provider are provided and new ones can be defined using another stack definition as a base. |
| 508 files | The files field contains a list of files that will be uploaded to the build server to be used as part of the provisioning process. |
| 510 tasks | The tasks field contains a list of provisioning tasks that will run when the server instance is provisioned. There are different task types can be defined, such as a script task for using scripts in provisioning and a file task for uploading files. |

602 ⸺ "name" : "ResourceManager",
504 ⸺ "version" : "9",
506 ⸺ "os" : "centos-6",
                                        604
508 ⸺ "files" : ["ResourceManager/ResourceManager-6.1.tar.gz", "ResourceManager/ac-ldap.zip"],
                                                                                          606
510 ⸺ "tasks" : [{
        630 ⸺ "type" : "script", ⸺ 632    ⎫
                "inline" : [                ⎬ TASK 1 (608)
                  "mkdir -p ~/ResourceManager"
                ]
        },
        630 ⸺ "type" : "file", ⸺ 634       ⎫
                "source" : "./ResourceManager/ResourceManager-6.1.tar.gz",  ⎬ TASK 2 (610)
                "destination" : "~/ResourceManager/"
        },
        630 ⸺ "type" : "script", ⸺ 632     ⎫
                "inline" : [
                  "cd ~/ResourceManager && tar -xf ResourceManager-6.1.tar.gz",  ⎬ TASK 3 (612)
                  "ls -la",
                  "./runai.sh 'pwd'"
```

| FIG.6A(Part 1) |
| FIG.6A(Part 2) |
| FIG.6A(Part 3) |

*FIG. 6A*

*FIG. 6A(Part 1)*

```
630 ~ "type": "script",    632
       "inline": [
         "sudo yum install -y openvpn easy-rsa unzip",
         "mkdir -p ~/ac-ldap"
       ]                                                    } TASK 4 (614)
    ]

630 ~ "type": "file",    634
       "source": "./ResourceManager/ac-ldap/ac-ldap.zip",
       "destination": "~/ac-ldap/ac-ldap.zip"              } TASK 5 (616)
    ]

630 ~ "type": "script",    632
       "inline": [
         "echo Installing OpenVPN...",
         "sudo yum install -y openvpn easy-rsa unzip",
         "echo Configuring OpenVPN Connection...",
         "cd ~/ac-ldap",
         "unzip ac-ldap.zip",
         "sudo cp ~/ac-ldap/ac-ldap-udp/ac-ldap.crt /etc/openvpn/ac-ldap.crt",
```

FIG. 6A(Part 2)

```
"sudo cp ~/ac-ldap/ac-ldap-udp/ac-ldap.ovpn/etc/openvpn/ac-ldap.conf",
"sudo cp ~/ac-ldap/ac-ldap-udp/userpass/etc/openvpn/userpass",
"sudo service openvpn start",
"sudo /sbin/chkconfig --add openvpn",
"echo "Installing OpenLDAP...",
"sudo yum -y install openldap-clients nss-pam-ldapd"                                 } TASK 6 (618)

630 ⌒ "type": "script",
    "inline": [
"echo Installing NFS...",
"sudo yum -y install autofs",
"echo Adding home and mounts to /etc/auto.master...",
"sudo -- sh -c 'echo \"/home \"/etc/home.nfs \"--timeout=60\" >> /etc/auto.master'",
"sudo -- sh -c 'echo \"/mnt \"/etc/mnt.nfs\" >> /etc/auto.master'",
"sudo -- sh -c 'echo \"* -fstype=nfs,rw,nosuid,soft  ecdemo-sched:/home/&\" > /etc/nfs.home'",
"sudo -- sh -c 'echo \"share -fstype=nfs,rw ecdemo-sched:/var/share\" > /etc/mnt.nfs'",     } TASK 7 (620)
```

FIG. 6A (Part 3)

Example Job Template

652 — SCHEDCFG[MOAB] FLAGS=enabledynamicnodes ⟵ 654

\# job template to run jobs in cloud on-demand
⟵ 660
658 — JOBCFG[ExampleCloudBurstingInstance] FLAGS=cloud 202 SELECT=TRUE 662 — JOBCFG[ExampleCloudBurstingInstance]
662 — TRIGGER=ElasticType=create,AType=exec,Action="/opt/moab/contrib/nodus-cloud-cli/elastic-ondemand.py -j $JOBID -o $OWNER -s <STACK_ID> -r
666
670 — <REQUESTGEOMETRY> ⟵ 668

672 — NODEIDLEPURGETIME 3600
674 — NODECFG[DEFAULT]
676 — TRIGGER=ElasticType=end,TType=elastic,AType=exec,Action="/opt/nodus-cloud-cli/elastic.py -r $OID" ⟵ 678

*FIG. 6B*

```
[root@demo-sched-]  # mdiag -n
compute node summary

Name (Node)              State    Procs    Memory           Opsys
ecdemo-compute05.ac      Busy     0:8      31986 :31986     linux
ecdemo-compute04.ac      Busy     0:8      31986 :31986     linux
ecdemo-compute03.ac      Busy     0:8      31986 :31986     linux
ecdemo-compute02.ac      Busy     0:8      31986 :31986     linux
ecdemo-compute01.ac      Busy     0:8      31986:31986      linux
Cloud - KF4B-0Z-S0VA.    Busy     0:1      994 :994         linux
Cloud - KF4B-01-V67B.    Busy     0:1      994 :994         linux
Cloud - KF4B-06-B0AO.    Busy     0:1      994 :994         linux
Cloud - KF4B-09-KWVC.    Busy     0:1      994 :994         linux
Cloud - KF4B-03-9AOH.    Busy     0:1      994 :994         linux
Cloud - KF4B-10-DGMM.    Busy     0:1      994 :994         linux
Cloud - KF4B-0S-U78X.    Busy     0:1      994:994          linux
Cloud - KF4B-07-PKAJ.    Busy     0:1      994 :994         linux
Cloud - KF4B-08-JRP0.    Busy     0:1      994 :994         linux
----                              0:49     168876:168876    ---

Total Nodes : 14 (Active: 14 Idle: 0 Down : 0)
[root@demo-sched -]# 0
```

FIG. 7

| | HOME | WORKLOAD | TEMPLATES | NODES | FILE MANAGER | CONFIGUREATION |
|---|---|---|---|---|---|---|

808 804 806 ON-PREMISES INTERFACE 802 860
810A NODES  810B  REFRESH INTERVAL 5s  810N

| NODE ID | STATUS | CORES AVAILABLE | JOBS | UTILIZATION CPU | TIME TO LIVE | OPERATIONAL TASK |
|---|---|---|---|---|---|---|
| CLOUD 1 NODE | DOWN | 864 0/1 | 0 | 0/0 868 | 99% 0 days 23hr 58min 32s | N/A |
| CLOUD 1 NODE | BUSY | 0/1 | 1 | 100/0 | 99% 0 days 23hr 58min 32s | N/A |
| CLOUD 1 NODE | BUSY | 866 0/1 | 1 | 100/0 | 99% 0 days 23hr 58min 32s | N/A |
| CLOUD 1 NODE | BUSY | 0/1 | 1 | 100/0 | 99% 0 days 23hr 58min 32s | N/A |
| CLOUD 1 NODE | BUSY | 0/1 | 1 | 100/0 | 99% 0 days 23hr 58min 32s | N/A |
| LOCAL NODE 1 | BUSY | 0/1 | 1 | 100/0 | N/A | N/A |
| LOCAL NODE 2 | BUSY | 0/1 | 1 | 100/0 | N/A | N/A |
| LOCAL NODE 3 | BUSY | 0/1 | 1 | 100/0 | ... | ... |

| HOME | WORKLOAD | TEMPLATES | NODES | FILE MANAGER | CONFIGUREATION |
|---|---|---|---|---|---|
| NODES | | REFRESH INTERVAL 5s | | | |

| NODE ID | STATUS | CORES AVIALABLE | JOBS | UTILIZATION CPU | TIME TO LIVE | OPERATIONAL TASK |
|---|---|---|---|---|---|---|
| CLOUD 1 NODE | IDLE | 868 — 1/1 | 0 | 0/0 | 99% 0 days 23hr 58min 32s | N/A |
| CLOUD 1 NODE | IDLE | 868 — 1/1 | 1 | 0/0 | 99% 0 days 23hr 58min 32s | N/A |
| CLOUD 1 NODE | IDLE | 868 — 1/1 | 1 | 0/0 | 99% 0 days 23hr 58min 32s | N/A |
| CLOUD 1 NODE | IDLE | 868 — 1/1 | 1 | 0/0 | 99% 0 days 23hr 58min 32s | N/A |
| CLOUD 1 NODE | IDLE | 868 — 1/1 | 1 | 0/0 | 99% 0 days 23hr 58min 32s | N/A |
| LOCAL NODE 1 | BUSY — 866 | 1/1 | 1 | 100/0 | N/A | N/A |
| LOCAL NODE 2 | BUSY — 866 | 1/1 | 1 | 100/0 | N/A | N/A |
| LOCAL NODE 3 | BUSY — 866 | 1/1 | 1 | 100/0 | N/A | N/A |
| ... | ... | ... | ... | ... | ... | ... |

*FIG. 8F*

CLOUD BURSTING TECHNOLOGIES

BACKGROUND

Cloud computing provides scalable and virtualized compute resources over the Internet to end users, developers, organizations (e.g., companies, universities, agencies, etc.), and the public. Typically, a "cloud" includes hardware and software resources (e.g., a physical and/or logical infrastructure, software services, etc.) for processing data and application workloads. The infrastructure of a cloud can be hosted in one or more data centers. The data centers can include a physical network underlay (e.g., the network fabric) as well as a logical network overlay running specific virtualization technologies. The data centers can include nodes, and the nodes can include processing units (e.g., processors), memory and/or storage units, networking interfaces, and other resources for performing compute operations. The nodes can be used to provision compute resources on the cloud, such as networking, processing, and storage resources. In some cases, nodes may be grouped into clusters, which can process and load balance jobs and provide resources to handle workload demands.

There are various cloud solutions available, which may run or support different platforms and technologies, and may have distinct configurations, resources, service guarantees, costs, locations, etc., giving customers an array of options. In some cases, customers may use an on-premises network site (e.g., a private cloud, branch site, local data center, etc.) to handle their workload and application demands locally. On-premises network sites may provide different advantages such as control, speed and locality, etc. However, on-premises network sites may have limited network or resource capacity, and thus may not be able to always handle all workload demands. To avoid service interruptions when an on-premises site is at full capacity, overflow traffic may be directed to a public cloud through cloud bursting. The public cloud can supplement the data and resources on-premises in order to handle the additional workload demands.

Unfortunately, however, such hybrid environments can be difficult to integrate, manage, and troubleshoot. The combination of cloud and on-premises technologies can add complexity and administrative difficulties, reduce the network operator's visibility of network conditions, and limit the network operator's ability to manage workloads, orchestrate resources and timely respond to network issues and demands.

SUMMARY

Additional features and advantages of the disclosure will be set forth in the description which follows, and in part will be obvious from the description, or may be learned by practice of the principles disclosed herein. The features and advantages of the disclosure may be realized and obtained by means of the instruments and combinations particularly pointed out in the appended claims. These and other features of the present disclosure will become more fully apparent from the following description and appended claims, or may be learned by the practice of the principles set forth herein.

Disclosed are systems, methods and computer-readable storage media which provide dynamic, intelligent, and efficient cloud bursting capabilities for improved and simplified access to cloud computing services across cloud environments. The cloud bursting technologies herein enable flexible, automated deployment and release of nodes and/or resources across distinct clouds. Infrastructure provisioning on different cloud environments can be accomplished with minimal time and effort. Jobs and workloads can be seamlessly executed on-premises or on any particular public cloud. Cloud costs and computing performance can be optimized with truly elastic cloud resource allocation and de-allocation and robust policy and SLA (service level agreement) enforcement. Powerful user interface tools can be implemented which provide visibility and control across cloud environments, for simplified and efficient management of resources, workloads, and conditions across cloud environments.

In some examples, a system, such as a multi-cloud bursting service, can generate one or more cloud agnostic burst templates for bursting one or more workload environments (e.g., infrastructure resources or nodes, execution environments, jobs or workloads, applications, cloud instances, etc.) on different cloud environments. Each cloud agnostic burst template can define a stack associated with a workload environment and one or more tasks for provisioning one or more cloud resources and deploying the workload environment on the one or more cloud resources. The stack can define or include, without limitation, one or more applications, one or more libraries, one or more services, an operating system, and/or data for the workload environment. The stack can be used to generate and/or deploy the workload environment or an image thereof.

The system can receive, from a local compute environment (e.g., an on-premises site such as a private cloud, network, or data center), a request to burst a workload environment onto a particular cloud environment(s) from the different cloud environments. The request can identify the particular cloud environment(s) for bursting the workload environment, and the particular workload or job to burst onto the particular cloud environment(s) and/or the specific nodes/resources and/or compute/execution environment to provision for the workload or job. The request can specify parameters or preferences for the workload environment and/or workload/job, such as timing parameters (e.g., resource reservation period), location parameters (e.g., locality or geographic preferences), performance parameters (e.g., quality of service, etc.), cost parameters, availability parameters, security parameters, etc. The request can also be generated in response to one or more triggers defined for the provisioning of cloud resources onto the local compute environment.

Based on a particular cloud agnostic burst template, the system can provision one or more resources from the particular cloud environment(s) and deploy the workload environment on the one or more resources from the particular cloud environment(s). For example, the system can provision one or more resources on a particular cloud environment and deploy the compute/execution environment or image (e.g., operating system, application(s), service(s), libraries, data, etc.) on the one or more resources. The cloud agnostic template allows the system to automatically provision the cloud resources and workload environment (e.g., provision and configure the nodes to run the workload or job) on the particular cloud environment(s) and any other cloud environment even if the cloud environments have different configurations, requirements, resources, platforms, etc.

The one or more resources can include one or more nodes (logical and/or physical) such as storage, networking, processing, and/or any other compute nodes. In some cases, the one or more resources can include a cluster of resources, such as a cluster of nodes or a pool of infrastructure resources. For example, the one or more resources can include a server (e.g., a virtual and/or bare metal server), a processor (e.g., a virtual and/or hardware processor), a storage device (e.g., a virtual and/or hardware storage or memory device), etc. The one or more resources can reside within a single device or system in a particular cloud environment or across multiple devices, networks, data centers, systems, etc., in the particular cloud environment. For example, a storage resource can include a single storage device on the particular cloud environment, such as a hard disk drive; a data store on the particular cloud environment; shards or storage nodes distributed across the particular cloud environment; an array of physical or logical disks or volumes on the particular cloud environment; etc.

In some cases, provisioning the one or more resources and deploying the workload environment on the one or more resources can include loading an image corresponding to the workload environment, and created based on the particular cloud agnostic burst template, on the one or more resources and launching a cloud instance based on the one or more resources hosting the workload environment created by the image. The image can include, for example, a virtual machine (VM), a software container, a server image, an execution environment, an application package, etc.

Once the system has provisioned the resources and workload environment, the local compute environment can process workloads or jobs through the provisioned resources. For example, the local compute environment can send traffic, workloads or jobs to the provisioned resources for processing. In some cases, the local compute environment can process overflow traffic, queued jobs, and/or workloads exceeding a threshold to the provisioned workload environment on the one or more resources. In some cases, the local compute environment can process and/or load balance workloads or jobs via the provisioned resources when a queue exceeds a threshold or one or more quality-of-service (QoS) parameters or policies (e.g., latency, throughput, performance, etc.) exceed a threshold.

The system can also add the one or more resources provisioned to an infrastructure layer of the local compute environment. The infrastructure layer can include resources associated with the local compute environment, including local resources in the local compute environment, the one or more resources provisioned from the particular cloud environment, and any other resources provisioned from any other cloud environment. For example, the infrastructure layer can represent the aggregated resources (logical and/or physical, local and/or remote) provisioned, reserved, and/or available for workloads or jobs for the local compute environment. The system can configure nodes or resources into clusters, including local nodes or resources and provisioned nodes or resources from one or more cloud environments.

The infrastructure layer, including the one or more resources provisioned from the particular cloud environment, can be depicted in a graphical user interface tool for viewing and managing resources and jobs for the local compute environment. For example, the graphical user interface tool can depict the nodes on the local compute environment and any other nodes provisioned/reserved from other cloud environments, as well as any workloads or jobs running, pending, canceled, completed, etc. To the user, nodes depicted in the graphical user interface tool from other cloud environments can appear as though the nodes are located in the local compute environment. In other words, nodes or resources added to the infrastructure layer can appear in the graphical user interface tool as if such nodes or resources are located or provisioned on the local compute environment. Thus, when the one or more resources provisioned from the particular cloud environment are added to the infrastructure layer, the graphical user interface tool can include the one or more resources in the list of resources of the local compute environment.

In some cases, jobs can be processed and/or defined according to job templates. The job templates can define a particular trigger for bursting the job onto one or more cloud environments, a type of cloud instance for bursting the job, a stack identifier uniquely identifying a stack for the job, a number of cloud instances that should be provisioned for the job, and/or any other parameters for the job such as timing parameters, processing parameters, purge parameters, etc. The trigger defined for a job can be, for example, an SLA or QoS threshold, an on-demand threshold, etc.

The cloud bursting mechanism herein can not only avoid or limit SLA violations, but can automate the provisioning of resources and bursting of instances across different clouds in a cloud agnostic manner, so network operators are not tied to any particular cloud provider or solution and do not have to manually configure or translate cloud bursting operations separately for different cloud providers or solutions. Instead, a cloud bursting system or service can define elastic triggers and the cloud agnostic burst templates for automating the translating, configuring, and provisioning tasks for different cloud providers or solutions.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only exemplary embodiments of the disclosure and are not therefore to be considered to be limiting of its scope, the principles will be described and explained with additional specificity and detail through the use of the accompanying drawings in which:

FIG. 5 illustrates an example schema for defining stacks in cloud agnostic stack templates implemented for cloud bursting across different clouds;

FIG. 6A illustrates an example stack template defined according to the schema shown in FIG. 5;

FIG. 6B illustrates an example job template defining jobs for bursting on clouds;

FIG. 7 illustrates an example output showing on-premises and provisioned cloud nodes as part of the same on-premises cluster;

FIGS. 8A through 8F illustrate example graphical user interfaces for viewing and managing jobs, templates, as well as on-premises nodes and provisioned cloud nodes, in accordance with various aspects of the disclosure.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
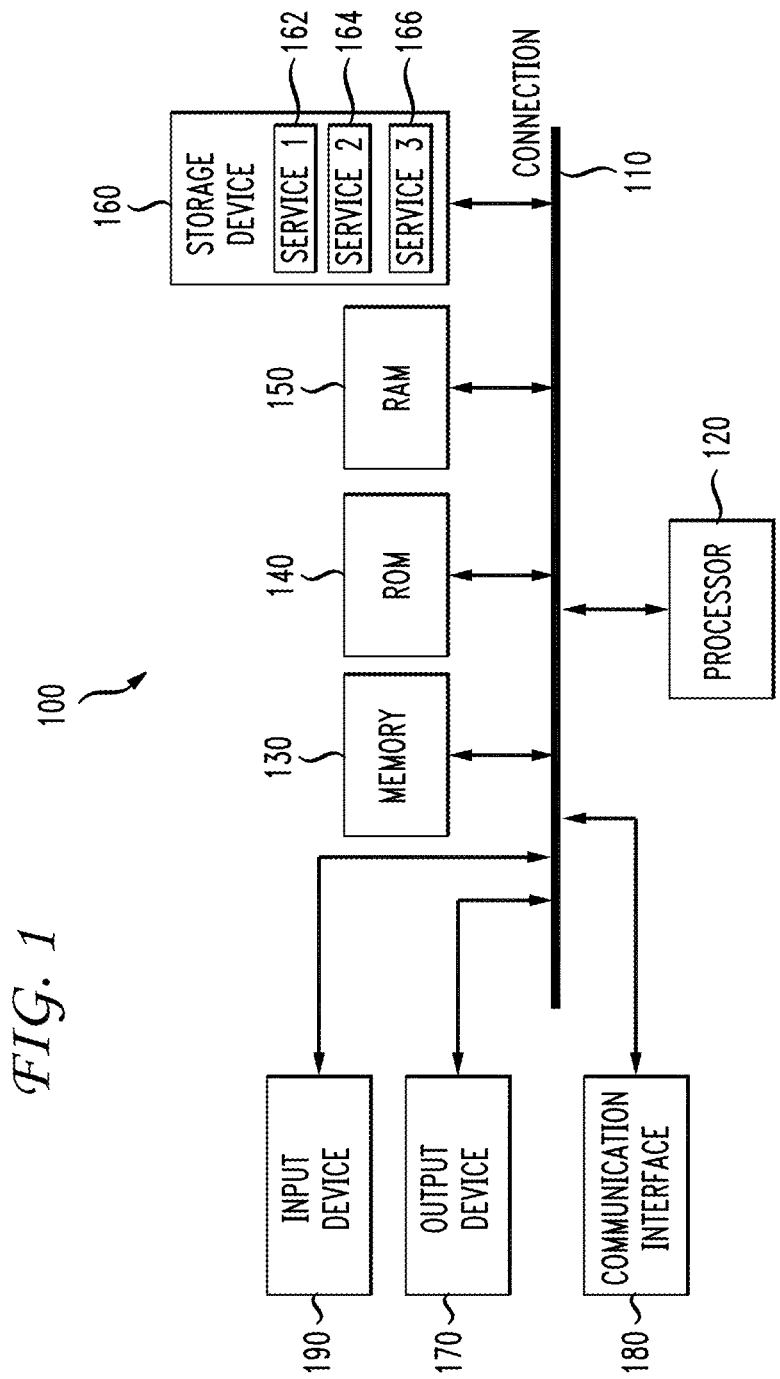
FIG. 1 illustrates an example computing device in accordance with various aspects of the disclosure.

With reference to FIG. 1, an example computing device 100 includes a processing unit (CPU or processor) 120 and a system connection 110 (e.g., a bus) that couples various system components including the system memory 130, such as read-only memory (ROM) 140 and random-access memory (RAM) 150, to the processor 120. These and other components can be configured to control the processor 120 to perform various actions. Other system memory may be available for use as well. It can be appreciated that the disclosure may operate on a computing device 100 with more than one processor 120 or on a group or cluster of computing devices networked together to provide greater processing capability. The processor 120 can include any general purpose processor and a hardware or software service, such as service 1 162, service 2 164, and service 3 166 stored in storage device 160, configured to control the processor 120 and/or a special-purpose processor where software instructions are incorporated into the processor design. The processor 120 may be a self-contained computing system, containing multiple cores or processors, a bus, memory controller, cache, etc. A multi-core processor may be symmetric or asymmetric.

The system service 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160, such as a hard disk drive, a magnetic disk drive, an optical disk drive, tape drive, a solid state drive, or the like. The storage device 160 can include software services 162, 164, 166 for controlling the processor 120. Other hardware or software services or modules are contemplated. The storage device 160 is connected to the system service 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, service 110, display 170, and so forth, to carry out the function. The basic components are known to those of skill in the art and appropriate variations are contemplated depending on the type of device, such as whether the device 100 is a portable, handheld computing device, a desktop computer, or a computer server.

Although the example described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system 100 is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. Use of the term "processor" should not be construed to refer exclusively to hardware capable of executing software. Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments can be implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 100 can practice all or part of the recited methods, can be a part of the recited systems, and/or can operate according to instructions in the recited tangible computer-readable storage media. Generally speaking, such logical operations can be implemented as modules or services configured to control the processor 120 to perform particular functions according to the programming of the module. For example, FIG. 1 illustrates three services 162, 164 and 166 which can be modules, software, and/or components configured to control the processor 120. These services may be stored on the storage device 160 and loaded into RAM 150 or memory 130 at runtime or may be stored as would be known in the art in other computer-readable memory locations.

FIG. 2 illustrates an example cloud computing environment 200. Cloud 1 (202), cloud 2 (204), cloud 3 (206), cloud 4 (208), and cloud N (210) can represent private clouds and/or public clouds associated with respective cloud providers. The clouds 202-210 can be provide various services and solutions to cloud consumers, such as software services (e.g., software as a service), platform services (e.g., platform as a service), infrastructure services (e.g., infrastructure as a service), etc. For example, the clouds 202-210 can host, manage, and provide resources which may be accessible by computing networks and/or devices associated with particular cloud consumers. The cloud consumers can include cloud customers (e.g., users and/or organizations) which receive specific cloud services from the clouds 202-210.

The clouds 202-210 can provision resources and/or services to cloud consumers over the network 220. The network 220 can include a public and/or private network, such as the Internet. The clouds 202-210 can provide fine-grained knowledge and control of the resources in the clouds 202-210 and the usage of cloud resources/services by cloud consumers, and can track and bill cloud consumers on that basis.

The clouds 202-210 can include various layers such as, without limitation, a service and/or resource orchestration layer which provides management, monitoring, and scheduling of resources (e.g., compute, storage, and network resources) into consumable services by cloud consumers; a physical resources layer (e.g., physical infrastructure) which can include computing, storage, and network resources; a user layer which can provide user or administrator functions; an access layer which can provide endpoint and/or inter-cloud functions; a management layer which can provide operational management, performance functions, and security functions; and a pooling and virtualization layer which can turn physical resources into virtual resources (e.g., virtual machines, software containers, virtual storage, virtual networks, virtual devices, etc.). Software and platform assets in the clouds 202-210 can include the runtime environments, applications, and software assets used to orchestrate and provide cloud services.

Virtualization software and technologies may be implemented on any particular cloud to create virtualized resources and/or environments, such as VMs, software containers, software-defined networks (SDNs), virtual network interfaces, virtual applications or services, virtual storage, virtual computing, etc. Virtualization software and technologies can also be used to create distributed, logical resources and/or micro-services. For example, virtualization technology can be used to create a logical pool of resources across one or more clouds or networks. As another example, virtualization technology can be used to create service chains, virtualized network functions (VNF), and/or logical or overlay networks on one or more clouds or networks.

The cloud computing environment 200 can also include an on-premises site 212. The on-premises site 212 can include a private cloud, branch, network, and/or data center. The on-premises site 212 can provide an entity, such as an enterprise, enhanced data security, locality, and control. The on-premises site 212 can be a cloud consumer or customer of clouds 202-210. As a customer of clouds 202-210, the on-premises site 212 can submit or route job requests for processing at any of the clouds 202-210, can deploy applications or services on the clouds 202-210, can use and provision resources from the clouds 202-210, etc.

For example, clouds 202-210 can provide overflow computing services or resources to the on-premises site 212. Workload management services can provision infrastructure resources and/or schedule jobs on the clouds 202-210 for the on-premises site 212. The workload management services can be used for management, scheduling, monitoring and provisioning workloads and/or resources in the cloud compute environment 200.

Figure 2A:
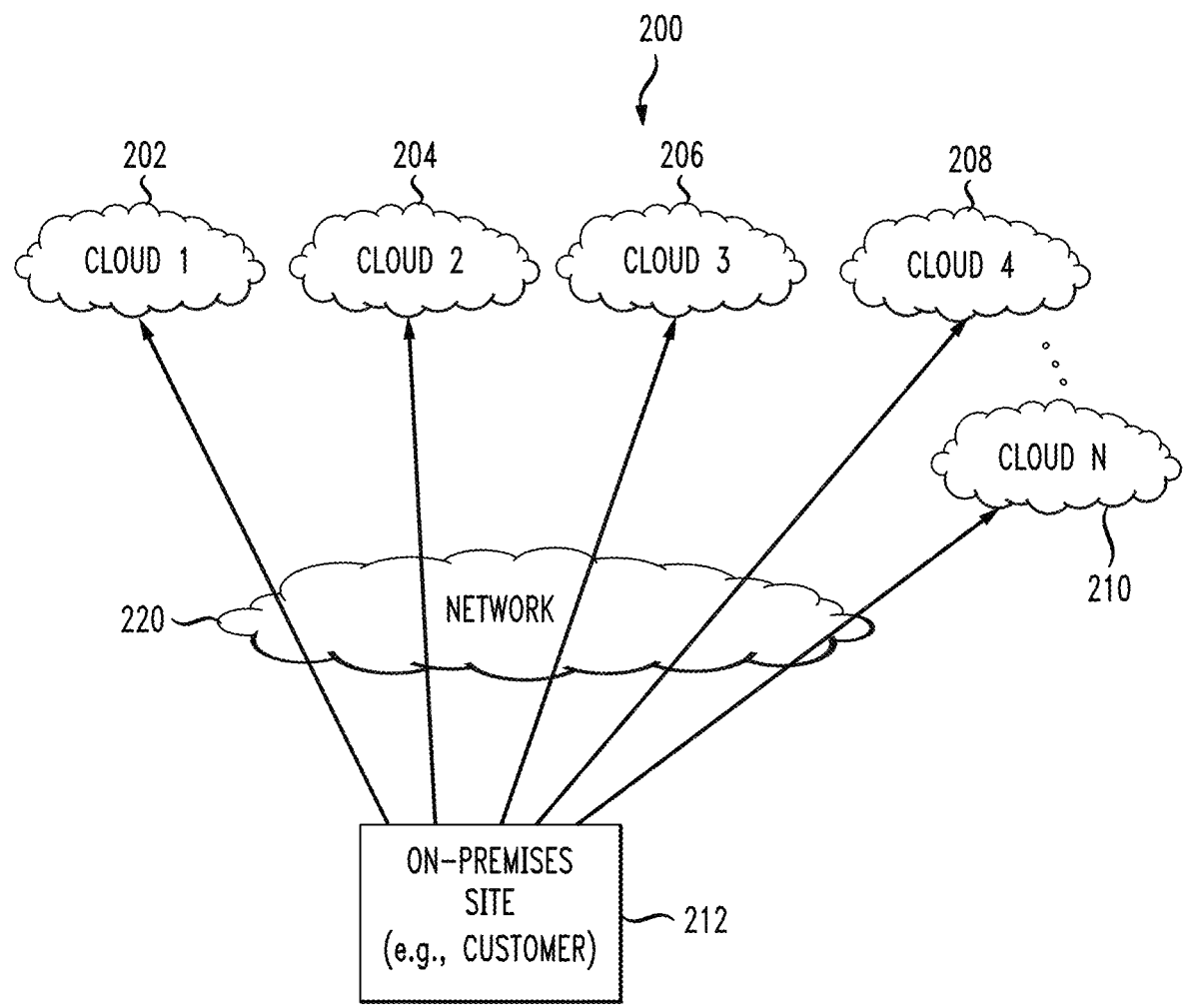
FIG. 2A illustrates an example cloud computing environment in accordance with various aspects of the disclosure.
Figure 2B:
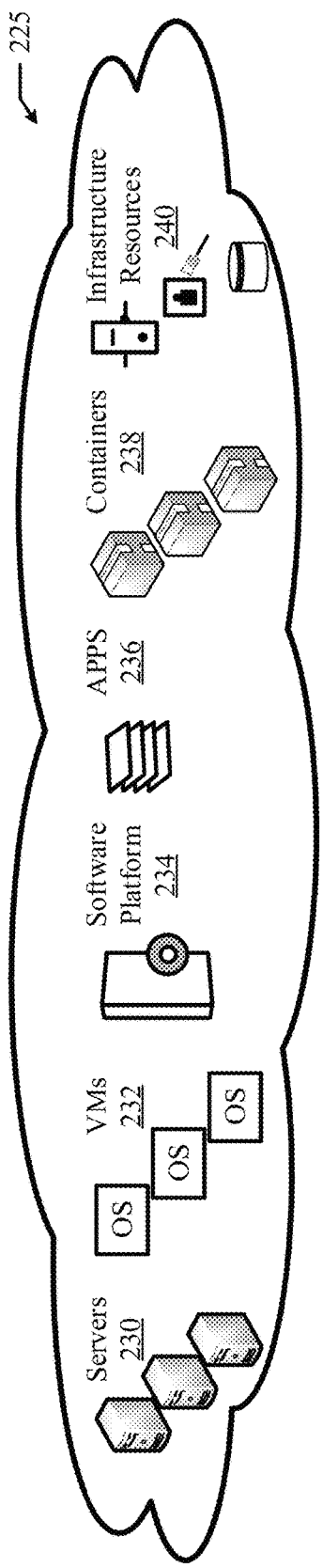
FIG. 2B illustrates an example pool of resources on a cloud, such as a cloud in the cloud compute environment shown in FIG. 2A.

FIG. 2B illustrates an example pool of resources 225 on a cloud (e.g., 202, 204, 206, 208, 210) in the cloud compute environment 200. In this example, the pool of resources 225 includes servers 230, VMs 232, software platforms 234, applications 236, containers 238, and infrastructure resources 240.

The servers 230 can host VMs 232, software platforms 234, applications 236, containers 238, and other software assets used to orchestrate and/or provide cloud services. Similarly, the VMs 232 can include specific applications, runtime environments, and software assets used to orchestrate and/or implement cloud services.

The software platforms 234 can include software and platform assets, such as runtime environments and software tools on which cloud consumers (e.g., on-premises site 212) can deploy applications. Cloud consumers can use the software platforms 234 to deploy specific applications on the cloud using one or more programming languages and execution environments.

Applications 236 can include software services running on the cloud, which can be accessed by cloud consumers. Example software services can include web services, database services, content management services, collaboration services, security services, personal productivity services, business services, email services, etc.

Containers 238 can include hardware or software that provides a particular execution environment for software. Containers 238 can be created and managed on the cloud based on container virtualization technologies which virtualize the underlying operating environment (e.g., the operating system kernel) of an application. The result is an isolated container on which the application can run.

The infrastructure resources 240 can include physical or virtual resources such as storage, network or compute resources. For example, the infrastructure resources 240 can include storage nodes, network nodes or interfaces, and processors. The infrastructure resources 240 can be based on the underlying hardware infrastructure of the cloud.

Figure 2C:
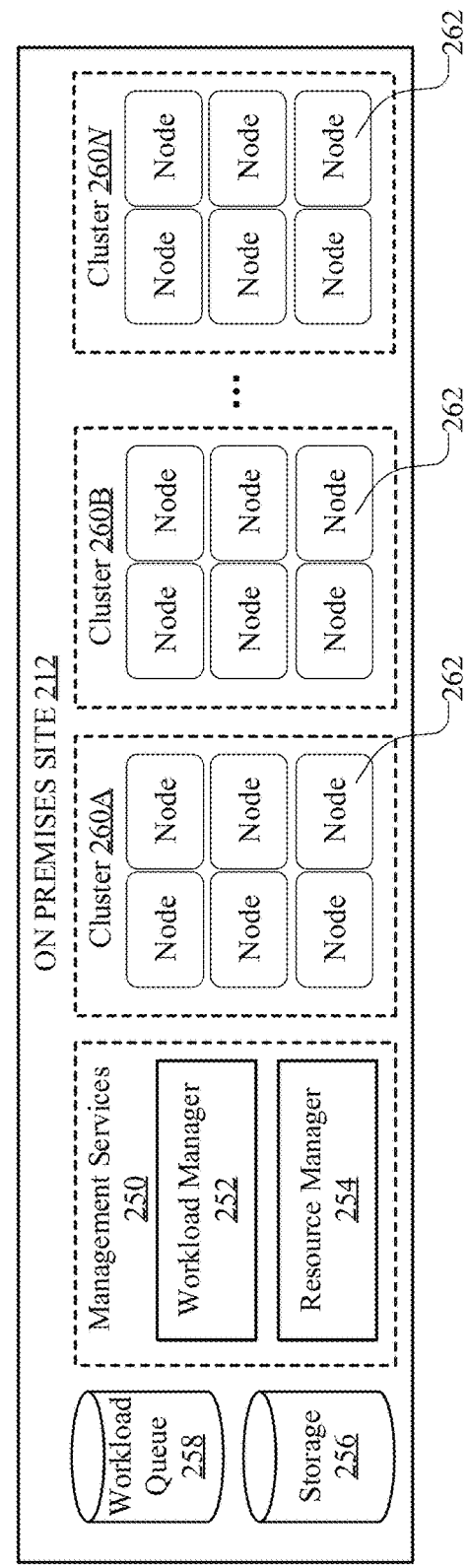
FIG. 2C illustrates an example configuration of a on-premises site, such as the on-premises site in the cloud compute environment shown in FIG. 2A.

FIG. 2C illustrates an example configuration 245 of the on-premises site 212. In this example, the on-premises site 212 can include nodes 262 representing the physical or logical resources of the on-premises site 212. The nodes 262 can include, for example, networking, storage, or compute resources. For example, the nodes 262 can include servers, computers, network devices (e.g., switches, routers, etc.), computing devices (e.g., storage devices, processors, etc.), and so forth.

The nodes 262 can be configured into clusters 260A, 260B, 260N (collectively "260" hereinafter). The clusters 260 can include a collection of nodes connected to work together to perform a particular task(s). For example, the nodes in a particular cluster (e.g., 260A) can be configured to run specific applications, store specific data (e.g., data blocks, replicas, files, etc.), process specific workloads or jobs, process specific requests, etc.

The on-premises site 212 can also include storage 256 for storing specific content or data. The storage 256 can include one or more databases, shards, storage volumes, storage components, etc. The on-premises site 212 can also include a workload queue 258, which can hold pending and/or processing jobs or requests.

The on-premises site 212 can management services 250 for managing, monitoring, scheduling, orchestrating, and/or processing workloads and resources. For example, the management services 250 can manage, orchestrate and schedule resources and jobs or workloads in the workload queue 258.

The management services 250 can include a workload manager 252 and a resource manager 254. The workload manager 252 can manage jobs or workloads submitted for the on-premises site 212, including jobs or workloads in the workload queue. The workload manager 252 can monitor the workload queue 258 and manage each job or workload in the workload queue 258 until completion. The workload manager 252 can identify specific requirements for jobs or workloads submitted to the on-premises site 212, such as resource and/or job or workload requirements (e.g., job priorities, data requirements, application requirements, performance requirements, etc.), and process the jobs or workloads according to the specific requirements for the jobs or workloads as well as any corresponding service level agreements (SLAs) or quality of service (QoS) arrangements.

The resource manager 254 can reserve, allocate, and/or provision resources for the jobs or workloads submitted. For example, the resource manager 254 can reserve, allocate, and/or provision one or more nodes 262 or clusters 260 for submitted jobs or workloads. The resource manager 254 can reserve, allocate, and/or provision resources dynamically, on-demand, or as requested. The resource manager 254 can coordinate with the workload manager 252 and together ensure that jobs or workloads submitted or in the workload queue 258 are scheduled and processed by the necessary resources according to the specific requirements, SLAs or QoS guarantees corresponding to such jobs or workloads.

In some cases, the workload manager 252 and resource manager 254 can provision external resources, such as cloud resources, for overflow traffic and process the overflow traffic through the external resources provisioned. For example, as further described below, certain conditions, such as backlogs, policy violations, and/or scarcity of resources, can trigger bursting onto a cloud (e.g., cloud 202) in order to process some of the submitted or queued jobs or workloads based on resources provisioned from the cloud. The workload manager 252 and resource manager 254 can coordinate with one or more of the clouds 202-210 and/or a —multi-cloud bursting service (e.g., multi-cloud bursting service 340A and/or 340B shown in FIG. 3) to provision cloud resources for certain jobs or workloads.

Figure 3:
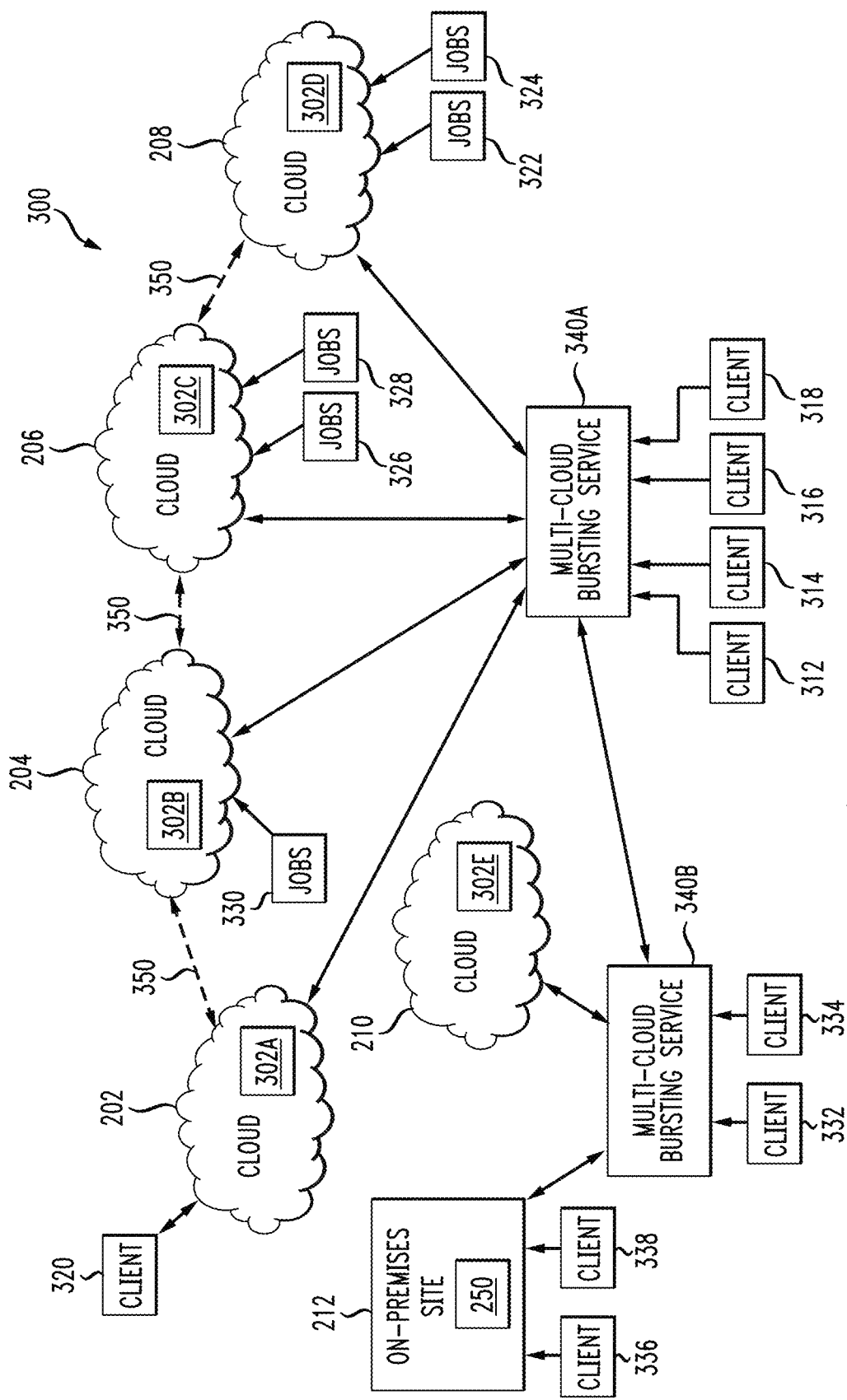
FIG. 3 illustrates an example configuration 300 of the cloud computing environment shown in FIG. 2A.

FIG. 3 illustrates an example configuration 300 of cloud computing environment 200 including multi-cloud bursting services 340A-B for managing the use, performance, and/or delivery of cloud services and providing intermediary services between a cloud consumer (e.g., on-premises site 212) and multiple cloud providers (e.g., clouds 202-210). Multi-cloud bursting services 340A-B (collectively "340") represent one or more entities that provide cloud bursting and/or brokering services between the on-premises site 212 and clouds 202-210. Multi-cloud bursting services 340 can be implemented via one or more systems (e.g., computing device 100 shown in FIG. 1), networks, servers, and/or configured to provide the cloud bursting tasks described herein.

Multi-cloud bursting service 340A receives requests from clients 312, 314, 316 and 318. Clients 312, 314, 316 and 318 can be users or entities (e.g., cloud consumers) with processing needs, resource needs, overflow requests, etc. Multi-cloud bursting service 340A can poll one or more of the clouds 202-210 to identify respective capabilities and characteristics, including any type of parameter (e.g., location, performance, cost, availability, latency, data or workload processing patterns, etc.) associated with the respective clouds 202-210. Examples of different capabilities or characteristics may include resource types, resource quantities, resource costs (e.g., per unit of compute resource, per request or job, per resource reservation time, per subscription, per amount of data, per requirement, etc.), QoS guarantees, SLAs offered, resource availability, parameters offered, processing patterns, efficiency parameters, etc. For example, cloud 202 may provide a five cents per unit cost but may only provide a mid-level SLA and a low-level reliability for jobs processed in that environment. Cloud 204 may have a high-level SLA available but with a cost of eight cents per unit.

Clouds 202, 204, 206, 208, and 210 may have respective management services 302A, 302B, 302C, 302D, 302E or some other management tool to determine how resources within each environment are consumed. Management services 302A, 302B, 302C, 302D, 302E can operate as described above with reference to management services 250 (including workload manager 252 and/or resource manager 254) shown in FIG. 2C, to manage resources in the respective environments. For example, management services 302A, 302B, 302C, 302D, 302E can manage jobs 322, 324, 326, 328, 330. Cloud consumers or third party requesters can submit jobs 322, 324, 326, 328, 330 directly to each respective cloud. A job can represent any job or workload that consumes resources in the compute environment, such as a web server request, a weather analysis, an accounting task, database query, etc.

The multi-cloud bursting services 340 can manage and/or facilitate cloud bursting to more than one cloud (202-210). To this end, the multi-cloud bursting services 340 can periodically poll the clouds 202-210 to identify their respective resource capabilities, conditions, characteristics, etc. In some cases, each of the clouds 202-210 can report to the multi-cloud bursting services 340 its resource capabilities, conditions, characteristics, etc., and/or any changes in its resource capabilities, conditions, characteristics, etc., instead of or in combination with the multi-cloud bursting services 340 polling the environments.

In order to communicate and function with multi-cloud bursting services 340, each of the clouds 302-310 may register with the multi-cloud bursting services 340. In some cases, a cloud may not register with the multi-cloud bursting services 340 but may otherwise make data available to the multi-cloud bursting services 340 for determining whether to send workload to that cloud.

Each of the multi-cloud bursting services 340 can develop a relationship with a number of clouds. As shall be discussed herein, the ability of the multi-cloud bursting services 340 to identify, aggregate, communicate, and manage compute resources across a number of different clouds can greatly simplify the ability of workloads to be processed on compute resources that match SLA requirements for the cloud consumers. The multi-cloud bursting services 340 can provide an easy and efficient supply chain management between a job from a customer who desires compute resources for the job and the consumption of selected resources on a cloud by that job.

In some examples, clients 312, 314, 316, 318 can submit a job to the multi-cloud bursting service 340A which then identifies suitable clouds (202-210) and submits the job on behalf of the client. Clients 312, 314, 316, 318 can query the multi-cloud bursting service 340A to determine which clouds are capable of servicing the workload within the workload, SLA or QoS requirements. In some cases, the clients 312, 314, 316, 318 can submit jobs directly to the appropriate cloud(s) based on information from the multi-cloud bursting service 340A. Therefore, rather than transmitting a job or workload, the multi-cloud bursting service 340A just passes information about the clouds 202-210 to the clients.

The multi-cloud bursting services 340 may utilize software and hardware tools that communicate seamlessly with management services (e.g., 302A-E) in the various clouds. This can greatly facilitate the determination of capabilities and information associated with the various clouds. In some cases, there can be a confidence level associated with the knowledge that is received from polling the separately administered compute environments. The multi-cloud bursting services 340 can adapt workload distribution as the confidence level changes or as learning algorithms interact with and record metrics associated with the various environments.

The polling of each of the clouds 202-210 can occur at predetermined intervals and/or dynamically by the multi-cloud bursting services 340. For example, the multi-cloud bursting services 340 may poll one or more clouds every half hour, daily, or on a per job basis. A large batch job can be submitted every evening at midnight for processing. In preparation for most advantageously ensuring that the optimal compute resources are identified and matched for processing the batch job, this system can automatically schedule to receive an updated polling of all of the separately administered compute environments in order to have a current snapshot of the resource capabilities across the different environments. In some cases, the SLA can require polling at a certain minimum interval.

The requests received by the multi-cloud bursting services 340 for compute resources can specify specific attributes, SLAs, QoS requirements, priorities, etc. The request or requestor can thus identify various parameters associated with the request. Such parameters can include a required cost, a required performance level, a required guarantee of resource availability, an amount of resources, locality requirements, reliability requirements, security requirements, etc. Based on the identified resource capabilities across the clouds 202-210 and the parameters associated with a request, the multi-cloud bursting services 340 can select compute resources in one or more of the clouds 202-210. The selection may involve identifying the resources and availabilities in one or more environments. In some cases, multi-cloud bursting services 340 can split jobs or workloads amongst more than one of the clouds 202-210. The multi-cloud bursting services 340 can also instruct or communicate with workload managers in the respective environments to ensure that specific resources are reserved or scheduled for processing the job or workload. In some cases, the multi-cloud bursting services 340 can serve as enforcers of the requirements (e.g., SLA, QoS, etc.) associated with a job or workload.

The process of managing the selection and reservation and actual consumption of resources may use many of the principles in the following patent applications: U.S. patent application Ser. No. 10/530,583, filed Apr. 7, 2005; U.S. Patent application Ser. No. 11/51,899, filed May 22, 2007, both disclosing providing advanced reservations in a compute environment; U.S. patent application Ser. No. 10/530, 582, filed Aug. 11, 2006 disclosing co-allocating a reservation spanning different compute resource types; U.S. patent application Ser. No. 10/530,581, filed Aug. 11, 2006 disclosing self-optimizing reservation in time of compute resources; U.S. patent application Ser. No. 10/530,577, filed Mar. 11, 2005 disclosing providing a self-optimizing reservation in space of compute resources; U.S. patent application Ser. No. 11/208,138, filed Aug. 19, 2005 disclosing providing dynamic roll-back reservations in time; U.S. patent application Ser. No. 11/629,940, filed Dec. 18, 2006 disclosing providing reservation masks within a compute environment; U.S. patent application Ser. No. 11/268,857, filed Nov. 8, 2005, now U.S. Pat. No. 7,356,770; U.S. patent application Ser. No. 12/033,386, filed Feb. 19, 2008 both disclosing graphically managing and monitoring a compute environment; U.S. patent application Ser. No. 11/155,090, filed Jun. 17, 2005 disclosing using transaction IDs for managing reservations of compute resources within a compute environment; U.S. patent application Ser. No. 11/155, 347, filed Jun. 17, 2005 disclosing providing threshold-based access to compute resources; U.S. patent application Ser. No. 10/530,576, filed Mar. 11, 2005 disclosing providing multi-resource management support in a compute environment; U.S. patent application Ser. No. 11/718,867, filed May 8, 2007 disclosing providing system jobs within a compute environment; U.S. patent application Ser. No. 11/155,091, filed Jun. 17, 2005 disclosing providing dynamic provisioning within a compute environment; U.S. patent application Ser. No. 10/589,339, filed Aug. 11, 2006, now U.S. Pat. No. 7,490,325 disclosing providing intelligent pre-staging of data in a compute environment; U.S. patent application Ser. No. 11/276,852, filed Mar. 16, 2006 disclosing providing a virtual private cluster; U.S. patent application Ser. No. 10/530,578, filed Mar. 11, 2005 disclosing providing object triggers; U.S. patent application Ser. No. 10/530,580, filed Apr. 7, 2005 disclosing providing object messages in a compute environment; U.S. patent application Ser. No. 10/530,575, filed Feb. 4, 2008 disclosing enforcing future policies in a compute environment; U.S. patent application Ser. No. 11/207,438, filed Aug. 19, 2005 disclosing interfacing a workload manager and scheduler with an identity manager; U.S. patent application Ser. No. 11/276, 013, filed Feb. 9, 2006 disclosing providing a fixed time offset based on a dedicated co-allocation of a common resource set; U.S. patent application Ser. No. 11/276,853, filed Mar. 16, 2006 disclosing automatic workload transfer to an on-demand center; U.S. patent application Ser. No. 11/276,854, filed Mar. 16, 2006 disclosing simple integration of an on-demand compute environment; U.S. patent application Ser. No. 11/276,855, filed Mar. 16, 2006 disclosing reserving resources in an on-demand compute environment; U.S. patent application Ser. No. 11/276,856, filed Mar. 16, 2006 disclosing an on-demand compute environment; U.S. patent application Ser. No. 11/279,007, filed Apr. 7, 2006 disclosing on-demand access to compute resources; U.S. patent application Ser. No. 11/763,010, filed Jun. 14, 2007 disclosing optimized multi-component co-allocation scheduling with advanced reservations for data transfers and distributed jobs; U.S. patent application Ser. No. 11/616, 156, filed Dec. 26, 2006 disclosing co-allocating a reservation spanning different compute resources types; U.S. patent application Ser. No. 12/023,722, filed Jan. 31, 2008 disclosing managing a hybrid compute environment; U.S. patent application Ser. No. 12/179,142, filed Jul. 24, 2008 disclosing managing energy consumption in a compute environment; U.S. patent application Ser. No. 12/245,276, filed Oct. 3, 2008 disclosing dynamically managing data-centric searches. Each of these patent applications is incorporated herein by reference.

The principles incorporated in by reference above describe various examples and implementations of brokering cloud computing services. Such principles include various methods for managing advanced reservations in a compute environment, collocating a reservation, spanning different compute resource types, self-optimizing reservations in time and or space, providing dynamic rollback reservations in time, providing reservation masks within a compute environment, providing transaction IDs for managing reservations in compute resources, providing threshold-based access to compute resources, providing multi-resource management support, providing system jobs, providing dynamic provisioning, providing intelligent pre-staging of data, providing a virtual private cluster, providing object triggers, providing object messages, enforcing future policies, interfacing a workload manager and scheduler with an identity manager, providing fixed-time offset-based dedicated co-allocation of common resource sets, workload transfer to an on-demand center, simple integration of an on-demand compute environment, reserving resources in an on-demand compute environment, on-demand access to compute resources, optimizing multi-component co-allocation scheduling with advanced reservations for data transfers and distributed jobs, co-allocating a reservation spanning different compute resource types, managing a hybrid compute environment such as having multiple operating systems that may be provisioned and repositioned according to workload need and managing energy consumption in the compute environment.

After receiving requests for processing workloads and gathering information from the clouds 202-210, the multi-cloud bursting services 340 can analyze the clouds using the various principles set forth above to select the appropriate resources in one or more clouds for processing the workload. In one example, the on-premises site 212 may include, in an SLA requirement enforced by multi-cloud bursting service 340B, a requirement that if its workload is being processed in cloud 208 and the performance level drops below a threshold or there is a failure of services from cloud 208, the multi-cloud bursting service 340B intelligently migrate 350 the job or workload to another cloud (e.g., 202) to provide continuity and meet the job or workload requirements.

The multi-cloud bursting services 340 can provide cloud bursting and/or brokering services in several ways. First, the multi-cloud bursting services 340 may provide information as previously explained. In this case, the requestors 312, 314, 316 or 318 may simply receive information about resources on the clouds 202-210. For example, the information can indicate that cloud 204 is offering a discount for processing a workload if the client can wait 24 hours. The multi-cloud bursting services 340 can interact with the submitter and manage the relationship between the respective cloud and the submitter to receive an accepted commitment and process the workload to the selected resources in the respective cloud or clouds.

Once a job or workload is communicated to a selected compute environment for the selected resources, which can span one or more of the compute environments, the multi-cloud bursting services 340 can further analyze parameters associated with how the selected compute environment is processing the communicated job or workload. If a particular threshold is met, the multi-cloud bursting services 340 can identify and select new compute resources from the compute resource environments and migrate all or part of the communicated job or workload to the new compute resources. This migration is represented by line 350.

In some cases, jobs or workloads can be communicated between the multi-cloud bursting services 340. For example, as illustrated in FIG. 3, multi-cloud bursting service 340B communicates with cloud 210 and on-premises site 212. Clients 332, 334, 336, 338 can submit requests and workload to multi-cloud bursting service 340B. In some cases, multi-cloud bursting service 340B can communicate with multi-cloud bursting service 340A to facilitate processing requests and workloads and/or communicating with clouds 202-208. This can be done transparent to the clients.

For example, multi-cloud bursting service 340B may not find ideal or satisfactory compute resources within cloud 208 or on-premises site 212. Accordingly, multi-cloud bursting service 340B may communicate the request to multi-cloud bursting service 340A. Multi-cloud bursting service 340A may migrate part or all of the job or workload submitted by clients 332, 334, 336 or 338 to one or more clouds (202-208) in order to satisfy the requirements associated with the job or workload.

In some cases, jobs or workloads can be communicated through the multi-cloud bursting services 340 to individual clouds through a respective instance of workload management services (e.g., 302A-E) within the individual clouds. For example, assume that requestor 320 requests compute resources and multi-cloud bursting service 340A selects cloud 202 to provision resources for the request. Rather than simply communicating workload to the cloud 202 for consumption, the multi-cloud bursting service 340A can manage the creation of an instance of workload management service (302A) in cloud 202.

In this scenario, several benefits can be realized. First, the workload management service 302A can perform necessary provisioning or modification of the reserved nodes in order to duplicate or create a particular environment which is suitable for the workload from the requestor 320. Furthermore, having an instance of the workload management service 302A on cloud 202 can enable efficient communication between the cloud 202 and the multi-cloud bursting service 240A. Therefore, in some cases, the multi-cloud bursting service 340A can receive a request from requestor 320, identify resources within cloud 202 for consumption, install an instance of workload management service 302A within cloud 202, obtain a modification (if necessary) of the selected resources via the installed workload management service 302A, provide communication of requirements between the multi-cloud bursting service 340A and the workload management service 302A, and finally enabling consumption of the resources associated with the request according to transmitted workload to the cloud 202. This creates a package of consumed resources that can grow and shrink according to requirements.

The environment that is created in cloud 202 can be provisioned to match a private cloud or network such as on-premises site 212. Thus, if a company has a private cloud (e.g., 212), the company can utilize a multi-cloud bursting service (e.g., 340B) for overflow workload additional resources needed from a public cloud. The multi-cloud bursting service can create an instance of workload management service on a public cloud and duplicate the environment of the private cloud or network (212) for the overflow workload.

As will be described further with reference to FIG. 4, the multi-cloud bursting services 340 can employ cloud agnostic templates (e.g., 406 shown in FIG. 4) to provision and burst across clouds (e.g., 202-210) from different cloud providers despite differences in cloud solutions, platforms, configurations, architectures, requirements, programming languages, resources, characteristics, etc., between the different clouds.

Figure 4:
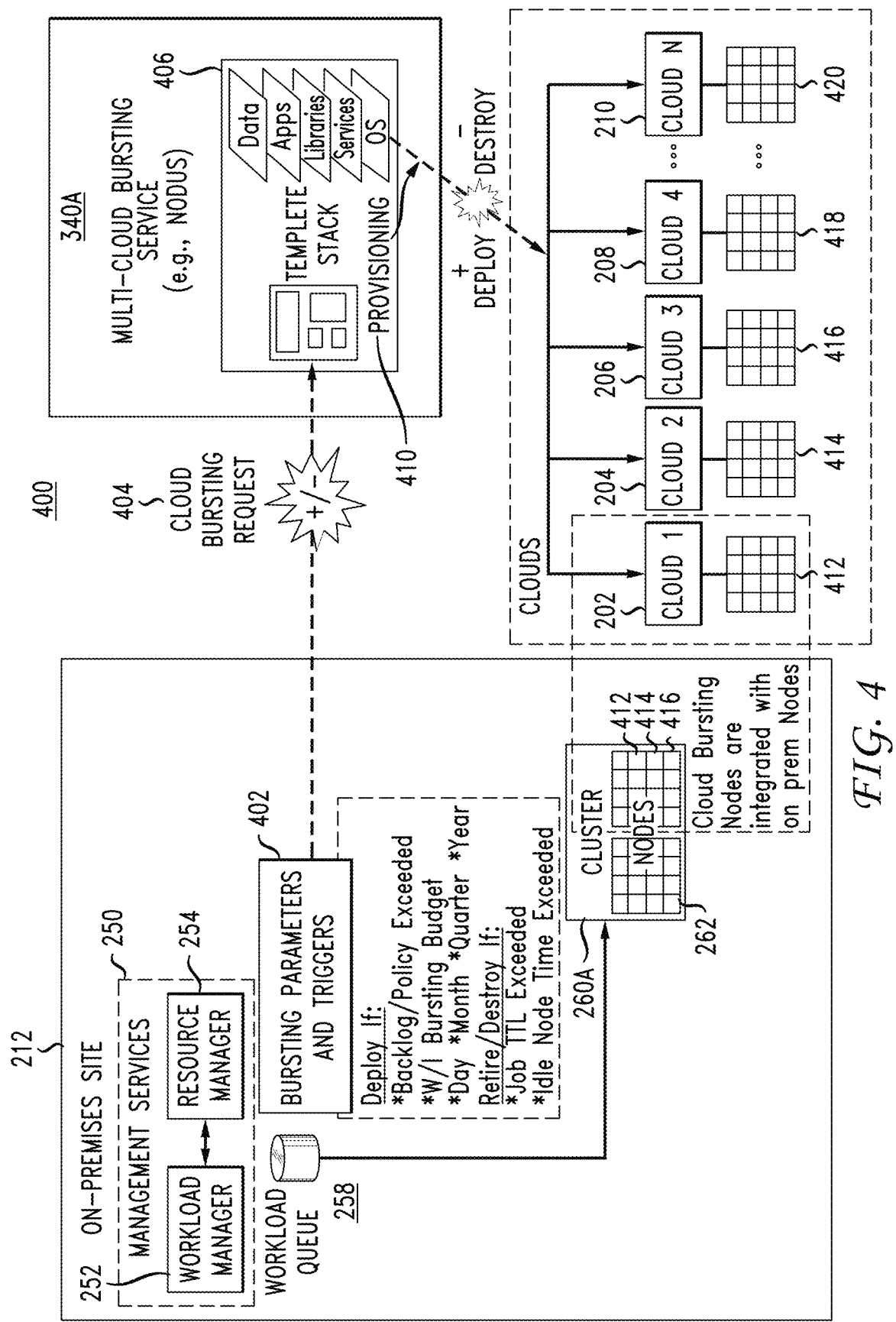
FIG. 4 illustrates an example configuration for cloud bursting across clouds from different cloud providers in a cloud agnostic manner.

FIG. 4 illustrates an example configuration 400 for cloud bursting onto multiple clouds 202-210 associated with distinct cloud providers and/or environments (e.g., architectures, resources, configurations, capabilities, resources, platforms, infrastructure, cloud solutions, etc.) in a cloud agnostic manner. In this example, the on-premises site 212 is configured with cloud bursting parameters and triggers 402 for sending a cloud bursting request 404 to multi-cloud bursting service 340A in order to burst to one or more of the clouds 202-210.

The cloud bursting parameters and triggers 402 can include one or more triggers for the cloud bursting request 404. The one or more triggers can include one or more rules or conditions for triggering the cloud bursting request 404 to multi-cloud bursting service 340A. The one or more rules or conditions can include, for example, a backlog threshold, a policy violation threshold, an SLA violation threshold, a capacity threshold, a job or workload request threshold, etc. For example, a trigger for generating and sending the cloud bursting request 404 can be that a backlog of jobs or workloads received or in the workload queue 258 exceed a threshold. To illustrate, the trigger can specify that the cloud bursting request 404 should be generated and sent when the workload queue 258 or backlog reaches or exceeds X number of jobs or workloads, or when X number of jobs or workloads are submitted to the on-premises site 212. As another example, a trigger for generating and sending the cloud bursting request 404 can be that an SLA, QoS guarantee, or requirement has been violated, such as a maximum latency requirement, a minimum performance requirement, a reliability requirement defining a maximum number of errors or failures, a policy defining a timing requirement for processing or completing submitted jobs or workloads, etc.

In some cases, the trigger may be based on the capabilities of the on-premises site 212, the availability of resources at the on-premises site 212, the likelihood that the on-premises site 212 will satisfy one or more requirements associated with a job or workload (e.g., based on, for example, the type or number of resources needed for the job or workload versus the type or number of resources at the on-premises site 212, the size of the job or workload relative to the resources at the on-premises site 212, etc.). For example, the trigger can define a threshold amount or a type of resources that should be available or capable of processing the job or workload at the time the job or workload request is submitted or within a specified grace period. If the threshold amount or type of resources available or capable is reached or exceed when the request is submitted or within the specified grace period, the trigger will cause the cloud bursting request 404 to be generated and transmitted to the multi-cloud bursting service 340A.

The management services 250 can monitor the cloud bursting parameters and triggers 402, the workload queue 258, incoming requests, and the resources at the on-premises site 212 to detect when triggering condition(s) are met for generating and sending the cloud bursting request 404. When the triggering condition(s) are met, the cloud bursting request 404 can be generated and transmitted to multi-cloud bursting service 340A to initiate a cloud bursting process as further described below. The cloud bursting request 404 can be transmitted to the multi-cloud bursting service 340A via, for example, an application programming interface (API). In some cases, a single API can be used to communicate with the multi-cloud bursting service 340A. The on-premises site 212 can send one or more API calls via the API to the multi-cloud bursting services 340 to communicate the cloud bursting request 404.

The on-premises site 212 can send the cloud bursting request 404 to multi-cloud bursting service 340A, to multiple multi-cloud bursting services (e.g., 340A and 340B) or any particular multi-cloud bursting service (e.g., multi-cloud bursting service 340A and/or 340B) from multiple multi-cloud bursting services (340) for the cloud bursting request 404. The determination of which and how many multi-cloud bursting services to send the cloud bursting request 404 to can be based on one or more factors, such as a relationship between the on-premises site 212 and the multi-cloud bursting services 340; a status of the multi-cloud bursting services 340; a responsiveness of the multi-cloud bursting services 340; a random selection algorithm; a respective link status (e.g., throughput, latency, distance, performance, congestion, functionality, security, availability, redundancy, etc.) between the on-premises site 212 and the multi-cloud bursting services 340; a load balancing scheme; the type or number of resources that are needed or being requested; the clouds associated with, connected to, or polled by each respective multi-cloud bursting service; the information received from each respective multi-cloud bursting service; etc. In some cases, the on-premises site 212 can send the cloud bursting request 404 to multiple multi-cloud bursting services (340) and select a particular multi-cloud bursting service based on the respective responses received from the multi-cloud bursting services (e.g., the timing of the responses, the information in the responses, etc.).

The cloud bursting request 404 can request provisioning or deprovisioning of one or more nodes and deployment/ launching of service instances (e.g., execution environments, software applications or tools, etc.). The bursting parameters and triggers 402 can dictate whether the cloud bursting request 404 is for provisioning nodes or deprovisioning nodes. The parameters in the bursting parameters and triggers 402 can define specific attributes, requirements, and information used in provisioning or deprovisioning nodes in response to the cloud bursting request 404. For example, the bursting parameters and triggers 402 can include parameters for provisioning nodes from one or more clouds (202-210), such as a reservation period (e.g., day, month, quarter, year, etc.), a type and/or number of resources (e.g., nodes) that should be provisioned, cost requirements, SLA requirements, QoS requirements, performance requirements, security requirements, reliability requirements, environment requirements, preferences, priorities, a budget for bursting, policies, etc. As another example, the bursting parameters and triggers 402 can include parameters for deprovisioning (e.g., destroying, canceling, un-reserving, etc.) nodes, such as a trigger (e.g., job TTL exceeded, idle node time exceeded, a job or workload completion, a threshold backlog or workload queue 258 reduction, a threshold cost, a threshold availability at the on-premises site 212, etc.

For example, the parameters can define a trigger for retiring or destroying provisioned nodes from clouds 202-210 based on a job TTL being exceeded or an idle node time being exceeded. As another example, the parameters can define a trigger for retiring or destroying provisioned nodes from clouds 202-210 when the workload queue 258 has below a threshold number of jobs/requests pending and/or processing. In some cases, the network operator at the on-premises site 212 can also manually retire or destroy provisioned nodes from clouds 202-210 based on any criteria, such as a number of pending jobs, a backlog reduction, etc.

In some cases, the bursting parameters and triggers 402 can be defined in specific job or workload templates. Such job or workload templates can identify specific jobs or workloads, associated requirements, associated dependencies, associated triggers for bursting, associated instructions for bursting, and/or any other information pertinent to the jobs or workloads. The job or workload templates can also identify specific cloud agnostic template stacks for provisioning resources for associated jobs or workloads on any cloud regardless of the cloud configurations, architecture, platform, characteristics, etc. Cloud agnostic template stacks will be further described below.

The cloud bursting request 404 to multi-cloud bursting service 340A can specify any parameters and/or requirements for the associated job or workload, such as a job priority, an SLA, a QoS requirement, a cost threshold, a performance requirement, a security requirement, a processing parameter, a resource requirement (e.g., a number and/or type of resources required or desired), a reliability requirement, etc. The cloud bursting request 404 can identify the job or workload that needs processing and any provisioning or deprovisioning instructions. In some cases, the cloud bursting request 404 can specify one or more particular clouds (202-210) being requested or prioritized for the job or workload.

The multi-cloud bursting service 340A receives the cloud bursting request 404 and processes the request based on the information provided in the request. The multi-cloud bursting service 340A can use cloud agnostic template stacks 406 for image management and provisioning 410. The cloud agnostic template stacks 406 can define one or more stacks which can define the provisioning dependencies and task. A stack can include the base operating system (OS), services, libraries, applications, and/or data for the execution environment for the jobs or workloads. The stacks can be used to create the images for the execution environment to be loaded on the provisioned cloud nodes. The multi-cloud bursting service 340A can manage the creation, modification, destruction, processing, verification, storing, and deploying of images or environments corresponding to the stacks.

A stack can also include tasks (e.g., scripts, commands, operations, steps, etc.) for provisioning node(s) on the clouds 202-210 (e.g., requesting or reserving nodes) and deploying (e.g., loading, configuring, etc.) specific execution environment (e.g., image) on the provisioned node(s). A stack can define the number or type of nodes to be provisioned, the number of instances to be installed and launched, the amount of time the nodes are to be reserved, when the instances should be installed and/or launched, etc. The tasks can include instructions or executable code to request and provision nodes and install and launch instances as defined in the stacks.

A stack can also define resource requirements for the defined instances, such as a number of processors, an amount of time the resources are to be reserved, etc. A stack can define the resource and/or instance requirements based on various factors, such as job priorities, job requirements, etc. For example, a stack can define tasks for requesting a higher number of nodes and/or processing elements, and launching a higher number of instances for higher priority jobs than lower priority jobs. A stack can define tasks for configuring various aspects of the provisioned nodes, as previously explained, such as the number of processors, the amount of memory, the number of network interfaces or addresses, etc.

A stack can also define the specific cloud and/or job configuration for the associated job or workload. For example, a stack can specify that job X should be processed on cloud 202 and job Y should be processed on cloud 204. A stack can include specific flags and parameters to be configured for the job on the specified clouds.

As previously explained, multi-cloud bursting services (e.g., 340A and 340B) can install instances of management services (e.g., 302A-E and 250) on the clouds 202-210, including workload manager services (e.g., 252) and/or resource manager services (e.g., 254). This process can also be performed using the cloud agnostic template stacks 406. For example, the cloud agnostic template stacks 406 can define the dependencies and environment for provisioning nodes on the clouds 202-210 and installing and launching instances of management services.

In some examples, the cloud agnostic stacks 406 can be defined in one or more files or objects. For example, a cloud agnostic stack can be defined in a JSON file which provides significant customization and flexibility.

Based on the stack(s) associated with a job or workload corresponding to the cloud bursting request 404, the multi-cloud bursting service(s) (e.g., multi-cloud bursting service 340A and/or 340B) can provision 410 specific cloud nodes 412-420 from one or more of the clouds 202-210 and configure the execution environments and parameters for the job or workload to be processed by the provisioned nodes. In the example of FIG. 4, the multi-cloud bursting service 340A provisions 410 one or more nodes 412 from cloud 202, one or more nodes 414 from cloud 204, and one or more nodes 416 from cloud 206. These provisioned nodes 412, 414, 416 can then be used to process the jobs or workloads associated with the cloud bursting request 404.

The nodes provisioned (e.g., 412, 414, 416) from the clouds (e.g., 202, 204, 206) can be integrated with the nodes 262 on the on-premises site 212. The on-premises site 212, the multi-cloud bursting service 340A that provisioned the nodes, and/or the clouds associated with the provisioned nodes (e.g., clouds 202, 204, 206) can coordinate the integration of the provisioned nodes with the on-premises nodes 262. In some cases, the management services 250 (e.g., via the workload manager 252 and/or the resource manager 254) on the on-premises site 212 can help with part or all of the integration of the provisioned nodes from the clouds.

In some cases, the provisioned nodes (e.g., 412, 414, 416) from the clouds (e.g., clouds 202, 204, 206) can be included in one or more clusters (e.g., cluster 260A) configured on the on-premises site 212. In the example of FIG. 4, the nodes 412, 414, 416 provisioned from clouds 202, 204, 206 are added to cluster 260A in the on-premises site 212, thus appearing as part of the cluster 260A of on-premises nodes 262 and working with the on-premises nodes 262 in the cluster 260A to process jobs or workloads. As further described below, a graphical user interface that depicts the cluster, nodes, jobs or workloads, job or workload statuses, etc., can depict the on-premises nodes 262 and provisioned nodes 412, 414, 416, as well as their associated jobs or workloads, as part of the cluster 260A as if all of such nodes reside on, or are part of, the on-premises site 212.

Once the reservation of the provisioned nodes 412, 414, 416 expires or a deprovisioning trigger is satisfied, the provisioned nodes 412, 414, 416 can be deprovisioned or unreserved. The deprovisioning trigger can automate the process of deprovisioning or removing the provisioned nodes 412, 414, 416 even before their reserved time lapses in order to save costs.

The cloud agnostic template stacks 406 are cloud agnostic in the sense that they can be used for bursting on multiple clouds (e.g., 202-210) from multiple cloud providers despite any differences in the cloud solutions, configurations, platforms, programming languages, resources, architecture, requirements, characteristics, etc., between the multiple clouds. The multi-cloud bursting service 340A can process the cloud agnostic template stacks 406 and translate defined tasks to commands, instructions, executable code, etc., suitable for each specific cloud being used for a bursting request. This process can be automated thus ensuring easy and convenient bursting across multiple cloud providers and solutions.

FIG. 5 illustrates an example schema 500 for defining stacks in cloud agnostic stack templates (e.g., 406). The schema 500 in this example includes fields 502-510 for defining stacks to be used for cloud bursting as previously explained. Field 502 is a name field for defining a unique name for the stack. The stack name provided in field 502 should be unique across all stack definitions. This allows the correct stack to be called or used when cloud bursting for a particular job or workload.

Field 504 is a version field where the user can define a version of the stack defined in field 502. If the stack is an application or package, the version of the application or package can be defined here.

Field 506 is an OS field used to specify the OS image for the stack defined in field 502. Base OS images for each cloud provider (e.g., clouds 202-210) can be available through the multi-cloud bursting service 340A shown in FIG. 4, and new base OS images can be defined for any stack definition.

Field 508 is a files field for specifying the files that should be uploaded to build the instance (e.g., server) as part of the provisioning process. The files can be identified based on name, location or path, etc.

Field 510 is a tasks field which contains the provisioning tasks. The tasks can include different types of tasks, such as script tasks for running scripts or code to perform provisioning and deployment operations; file tasks for uploading and/or manipulating files and data used for the provisioning, jobs or workloads, etc.; command tasks for running commands (e.g., configuration commands, troubleshooting commands, launch commands, operations, etc.); and so forth.

FIG. 6A illustrates an example stack template 600 defined according to the schema 500 for installing and configuring a resource manager service (e.g., resource manager 254), a VPN (virtual private network) application, namely, OpenVPN, a lightweight directory access protocol (LDAP) implementation for directory services, namely, OpenLDAP, and a distributed file system protocol, namely, NFS (network file system).

The name 602 specified in the name field 502 for the stack template 600 is ResourceManager. This is a unique name of the stack template 600 across all stack definitions. The version field 504 specified the version which in this example is version 9. The OS field 506 defines Linux CentOS 6 as the base OS for the stack. The files field 508 identifies the various files that will be uploaded to the build server to build the stack or image. In this example, the files field 508 identifies a package for the resource manager service, including the relative path of the package, and the LDAP package, including its relative path.

The tasks field 510 defines task 1 (608), task 2 (610), task 3 (612), task 4 (614), task 5 (616), task 6 (618), and task 7 (620), which will be further described below. Each of the tasks 1-7 (608-620) defines the respective type of task (e.g., script task, file task, etc.) and includes the respective instructions, scripts, commands, parameters, etc., for performing the task.

For example, task 1 (608) includes a task type definition 630 for a script task 632, indicating that the task involves one or more scripts to be executed. Included in task 1 (608) is an inline script, which provides one or more commands to execute. The commands can be concatenated by new lines and turned into a single file, so they are executed within the same context. This allows for changing of directories in one command and using something in the directory in the next line and so on. Inline scripts provide a simple way to perform simple tasks within the machine. In this example, the task defines a shell command for creating a subdirectory in the root directory, which in this example is "~/ResourceManager".

Task 2 (610) includes a task type definition 630 which defines the task type as a file task 634, which is a task for uploading one or more files. The file to be uploaded in this example is package 604 for the resource manager service. Task 2 (610) defines the source path or location for the file (package 604) and the destination path or location for the file (package 604), which in this case is the path "~/ResourceManager" of the subdirectory created in task 1 (608).

Task 3 (612) includes a task type definition 630 for a script task 632, indicating that the task involves one or more scripts to be executed. The script task in this example is an inline script including an array of shell commands. The commands include a change directory command (cd) to enter the subdirectory with the path "~/ResourceManager" created in task 1 (608), a tar command to extract the contents of the package 604 uploaded to that subdirectory in task 2 (610), an ls command to list the contents of the subdirectory after the package contents are extracted, and a command to run a shell script and execute the pwd (print working directory) command.

Task 4 (614), includes a task type definition 630 for a script task 632. The script task is an inline script for installing OpenVPN, easy-rsa which is a utility for building and managing a PKI (public key infrastructure) CA (certificate authority), and an unzip utility via an example package manager (e.g., Yellowdog Updater Modified or yum).

Task 5 (616) includes a file task 634, as specified in the task type definition 630. The file task here uploads the LDAP package 606 from the subdirectory with the path "~/ResourceManager" created in task 1 (608) to a new destination path (e.g., "~/ac-ldap/ac-ldap.zip").

Task 6 (618) includes a script task 632 as specified in the task type definition 630. The task is an inline script with commands for installing OpenVPN, configuring an OpenVPN connection, starting an instance of OpenVPN, copying LDAP files, and installing OpenLDAP client.

Task 7 (620) includes a script task 632 as specified in the task type definition 630. The task is an inline script with commands for installing NFS and mounting a directory.

The stack defined in stack template 600, including the various tasks, parameters, and fields, are provided as an example for illustration purposes. One of ordinary skill in the art will recognize that many other stacks, tasks, parameters, and fields can be defined for many different purposes and are within the spirit of the disclosure and contemplated herein.

Moreover, the stack template 600 can be defined in any type of file(s), such as a JSON file. Once the stack template 600 is defined, it can be used to build the stack. For example, the stack can be built by running a particular script, command(s), or code, such as a build command, referencing the stack template file. This can create the stack in a particular region, which can be defined in the build process, and return a stack identifier (ID) which can be used to reference the stack in the cloud.

FIG. 6B illustrates an example job template 650 defining jobs for bursting and running on one or more clouds. The job template 650 includes scheduling parameters 652 for configuring a workload and resource orchestration service (e.g., management services 250), which in this example is MOAB WORKLOAD MANAGER by ADAPTIVE COMPUTING, INC. The parameters 652 include a flag 656 for enabling dynamic nodes. Dynamic nodes are nodes that can be added or removed at any time (e.g., based on a parameter or condition such as TTL).

The job template 650 includes a job configuration 658 for an example cloud bursting instance, such as a cloud web service instance or a cloud database service instance. The job configuration 658 includes a flag 660 identifying the cloud 202 for bursting the example cloud bursting instance. The job configuration 658 includes a trigger definition 662, which in this example defines an elastic trigger (e.g., 402) which when enabled requests or orders the example cloud bursting instance on the cloud (e.g., cloud 202). In this example, this is done through a script 664 that based on the trigger executes a job 666 identified by a job ID and implements a stack 668 referenced by a stack ID.

The request geometry parameter 670 specifies how nodes are requested when the trigger is satisfied. The values provided in this parameter can define the number of nodes to request, the time or duration for reserving the nodes requested, the number of processors for a node, etc. A purge parameter 672 can specify how nodes are removed. For example, nodes can be purged after a TTL or purge time has passed. The purge value can be defined in the purge parameter 672.

A node configuration 674 can define configuration parameters and/or actions for configuring nodes. In this example, a trigger 676 is defined for executing a node provisioning action defined by a script 678 referenced in the node configuration 674.

The job template 650 in this example can be implemented to configure jobs for on-demand elastic computing in the cloud computing environment (e.g., 200). In some cases, on-demand elastic computing can be different from backlog-based elastic computing in that it allows jobs to specify that they are meant to run in the cloud upon execution, without regard to the existence or state of a job backlog. Once a job is submitted, resources in the cloud are allocated so that the job can start running immediately on those cloud resources.

As illustrated herein, the job template 650 and stack template 600, as well as the multi-cloud bursting service 340A can be used to provide seamless bursting to multiple cloud providers and compute environments (e.g., clouds 202-210). The specific environment for bursting can be defined for the multi-cloud bursting service 340A, including the templates (e.g., 600, 650) used for provisioning for nodes in the cloud as part of bursting. One or more templates (e.g., 600, 650) can be defined once and the multi-cloud bursting service 340A can use the one or more templates to provision and burst on any cloud provider and compute environment (e.g., clouds 202-210), resulting in end-to-end, seamless provisioning/bursting to any of multiple cloud providers and compute environments.

The provisioned nodes from the cloud provider(s) can become part of the on-premises nodes (e.g., 262). The agnostic aspect (e.g., cloud agnostic stack template 600 and cloud agnostic job template 650) define the steps, code, and items (e.g., OSs, applications, libraries, services, data, tools, configuration files, etc.) needed to provision/burst on any cloud provider (e.g., clouds 202-210) of choice. The multi-cloud bursting service 340A has the intelligence to process the templates 600, 650, identify the tasks, and translate the tasks into proper commands or executable instructions to provision/burst in the various cloud providers (e.g., clouds 202-210), irrespective of the respective cloud provider solution (e.g., configuration, platform, environment, setup, architecture, requirements, syntax, usage settings, etc.) of the various cloud providers and compute environments. The network operator (e.g., administrator at the on-premises site 212 and/or multi-cloud bursting services 340) can provide cloud provider configuration information in the cloud template (e.g., 600, 650), which can include credentials for the respective cloud(s) (e.g., 202-210).

As part of an elastic computing solution, the client (e.g., user or consumer) can configure parameters (e.g., via a job template) to keep track of processor seconds on all dynamic nodes to limit over-bursting. For example, a particular configuration allows 1000 processor seconds of use every day, then if a job needs to burst and the used processor seconds reaches 1000 before the job can burst, the trigger to burst the job will not fire, and an error message is generated.

There are different values that can be set, such as day, month, quarter, or year. The second count resets at the beginning of each period. For ease of use, limits can be set based on processor hours, and the system can automatically convert the hours to seconds.

There are other example policies that can be set in the workload and orchestration platform (e.g., via a job template or configuration file) to limit over-bursting. For example, the following parameters can be specified by processor seconds:
MAXDAILYELASTICPROCSECONDS
MAXMONTHLYELASTICPROCSECONDS
MAXQUARTERLYELASTICPROCSECONDS
MAXYEARLYELASTICPROCSECONDS To specify by processor hours, the following parameters can be used:
MAXDAILYELASTICPROCHOURS
MAXMONTHLYELASTICPROCHOURS
MAXQUARTERLYELASTICPROCHOURS
MAXYEARLYELASTICPROCHOURS Usage policies can be set at the global partition or QoS level, for example.

Global Partition: once the elastic node first appears, the workload and orchestration platform (e.g., management services 250) can begin keeping track of its processor seconds or hours. If the processor seconds reaches the limit, it will not fire off the elastic trigger so no new nodes will come in. For example: PARCFG[ALL] MAXDAILYELASTICPROCSECONDS=1000.

QoS: processor seconds or hours can start being counted once a job is submitting using that particular QoS. For example: QOSCFG[HIGH] MAXDAILYELASTICPROCSECONDS=500.

Here, a job is submitted requesting the "HIGH" QOS and the processor seconds begin ticking up for that QOS.

FIG. 7 illustrates an example output 700 showing on-premises and cloud nodes as part of the same on-premises cluster, which in this example is cluster 260A in on-premises site 212. The output 700 displays a name 702 of each of the nodes 262, 412, 414, 416, 418, 420 in the cluster 260A. The output 700 also displays, for each node, a state 704, processors 706, memory 708, and an OS.

As illustrated in output 700, the cluster 260A in on-premises site 212 includes nodes 262 from the on-premises site 212 as well as nodes 412, 414, 416, 418, 420 provisioned from the clouds 202-210. Thus, on-premises and cloud nodes are clustered together to process jobs or workloads for the on-premises site 212, and appear as one single cluster as if all nodes resided on the on-premises site 212.

FIGS. 8A-E illustrate example views 800, 840, 850, 860, 870, 880 of graphical user interfaces available to the on-premises site 212 for viewing, monitoring, managing, and configuring jobs or workloads, templates, nodes, clusters, configurations, files, queues, statuses, etc., for the on-premises site 212 and any cloud provider, including on-premises nodes, nodes provisioned from the clouds 202-210, and jobs or workloads processed by such nodes.

Figure 8A:
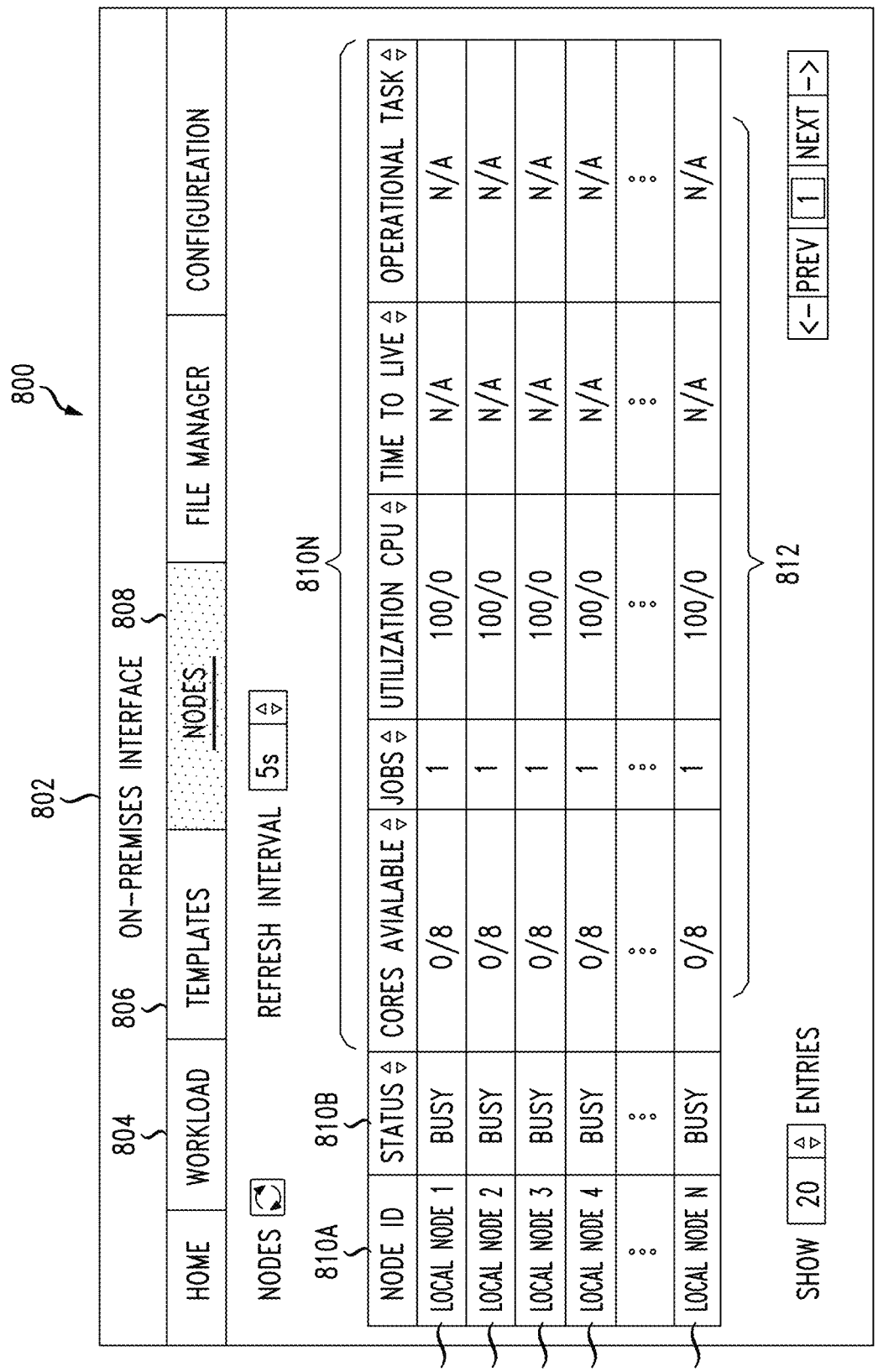
Figure 8A:
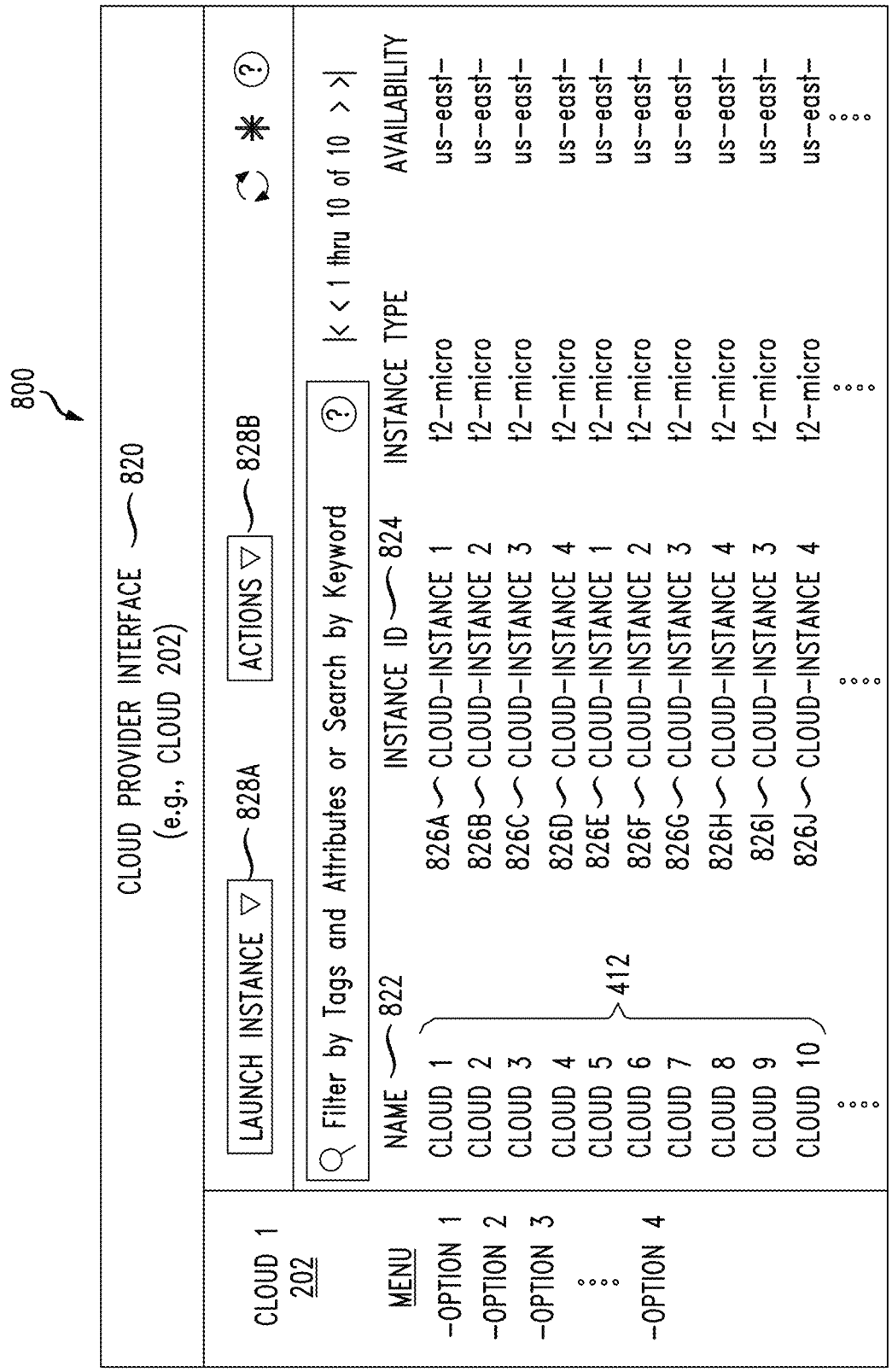

Referring to FIG. 8A, view 800 shows an on-premises interface 802 and a cloud provider interface 820. The on-premises interface 802 corresponds to on-premises site 212, and the cloud provider interface 820 corresponds to any particular cloud provider and associated cloud environment, such as cloud 202.

The cloud provider interface 820 illustrates nodes 412 and instances 826A-J (collectively "826") in cloud 202. The cloud provider interface 820 also depicts the name 822 and instance identifier (ID) 824 for each of the nodes 412 and instances 826.

Moreover, the cloud provider interface 820 can provide selectable graphical elements 828A-B (e.g., buttons, drop-downs, etc.) that allow a user to select items and/or initiate actions. In this example, element 828A is a selectable button for launching an instance on the cloud 202, and element 828B is a selectable button for initiating an action, such as cancelling an instance or node, pausing a job, etc.

The on-premises interface 802 depicts tabs 804, 806, 808 for navigating to specific areas or screens of the interface 802. The tabs 804, 806, 808 include a workload tab (804), a templates tab (806), and a nodes tab (808). In this example, the on-premises interface 802 shows a screen presented when nodes tab (808) is selected.

The screen in the nodes tab (808) identifies nodes on the on-premises site 212. In this example, the nodes include node 262A, 262B, 262C, 262D, and 262E from the on-premises site 212. The nodes 262A-E can represent nodes in a cluster(s), a grid(s), or all or part of the nodes (e.g., active nodes, available nodes, deployed or provisioned nodes, functioning nodes, etc.) in the on-premises site 212.

The screen also includes descriptive columns 810A-N (collectively "810"), which contain information about nodes 262A-E. In this example, column 810A is a node ID column which contains the respective node ID of each node (262A-E), column 810B is a status column which provides the respective status (e.g., busy, active, inactive, idle, pending, canceled, etc.) of each node (262A-E), and columns 810N are columns providing various respective parameters or information 812 for each of the nodes 262A-E.

In this example, columns 810N include a column detailing the number of cores available for each node (262A-E), a column detailing the number of jobs corresponding to each node (262A-E), a column detailing the CPU utilization for each node (262A-E), a column detailing the TTL (time to live) for each node (262A-E), a column detailing the operational task(s) for each node (262A-E), etc. Columns 810N are examples provided for illustrative purposes. Other columns detailing other information or parameters are also contemplated herein, such as instance identifier columns, location columns, error columns, software environment columns, etc.

Figure 8B:
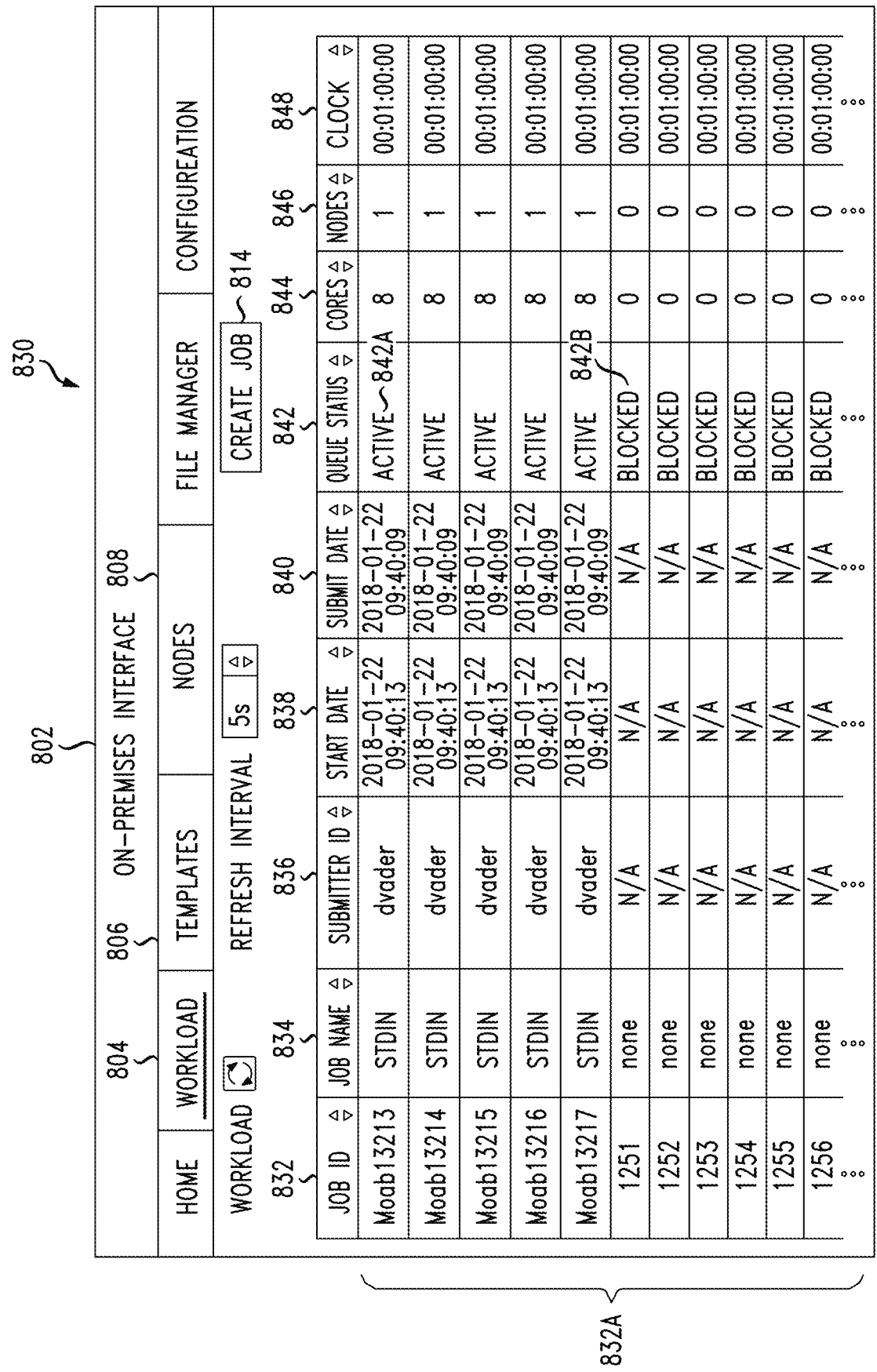
Figure 8B:
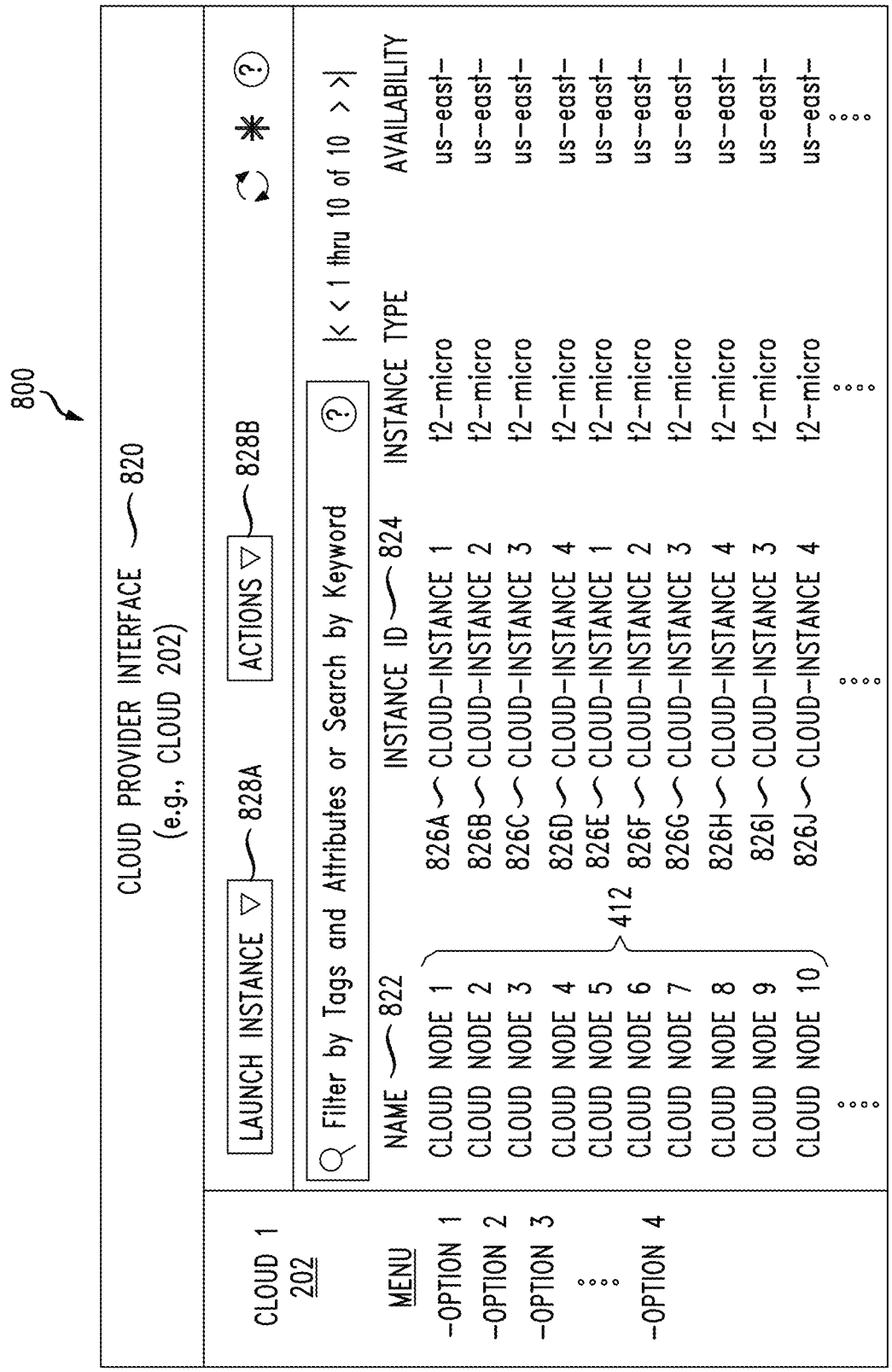

Referring to FIG. 8B, view 830 illustrates a screen in the on-premises interface 802 when the workload tab (804) is selected. The workload screen shows a table of workloads on the on-premises site 212. The table includes columns 832-848 containing information about jobs in the on-premises site 212. Column 832 identifies jobs 832A based on their respective job ID. Column 834 identifies the job name of each of the jobs 832A.

Column 836 identifies a submitter ID for each job, and columns 838 and 840 identify respectively a job start date and job submit date for each job.

Column 842 identifies a queue status for each job. In this example, the queue status of jobs 832A include an active status 842A or a blocked status 842B. Other statuses are also possible and contemplated herein, such as a pending status, a canceled status, an idle status, a paused status, etc.

Columns 844 and 846 respectively identify the number of cores and nodes associated with each job. Column 848 identifies a clock value for each job.

The workload screen can also include selectable graphical elements, such as drop-downs, form fields, input elements, buttons, etc., for initiating or controlling actions or operations. In this example, the workload screen includes a create job button 814 that allows a user to create one or more jobs right from the interface 802.

Figure 8C:
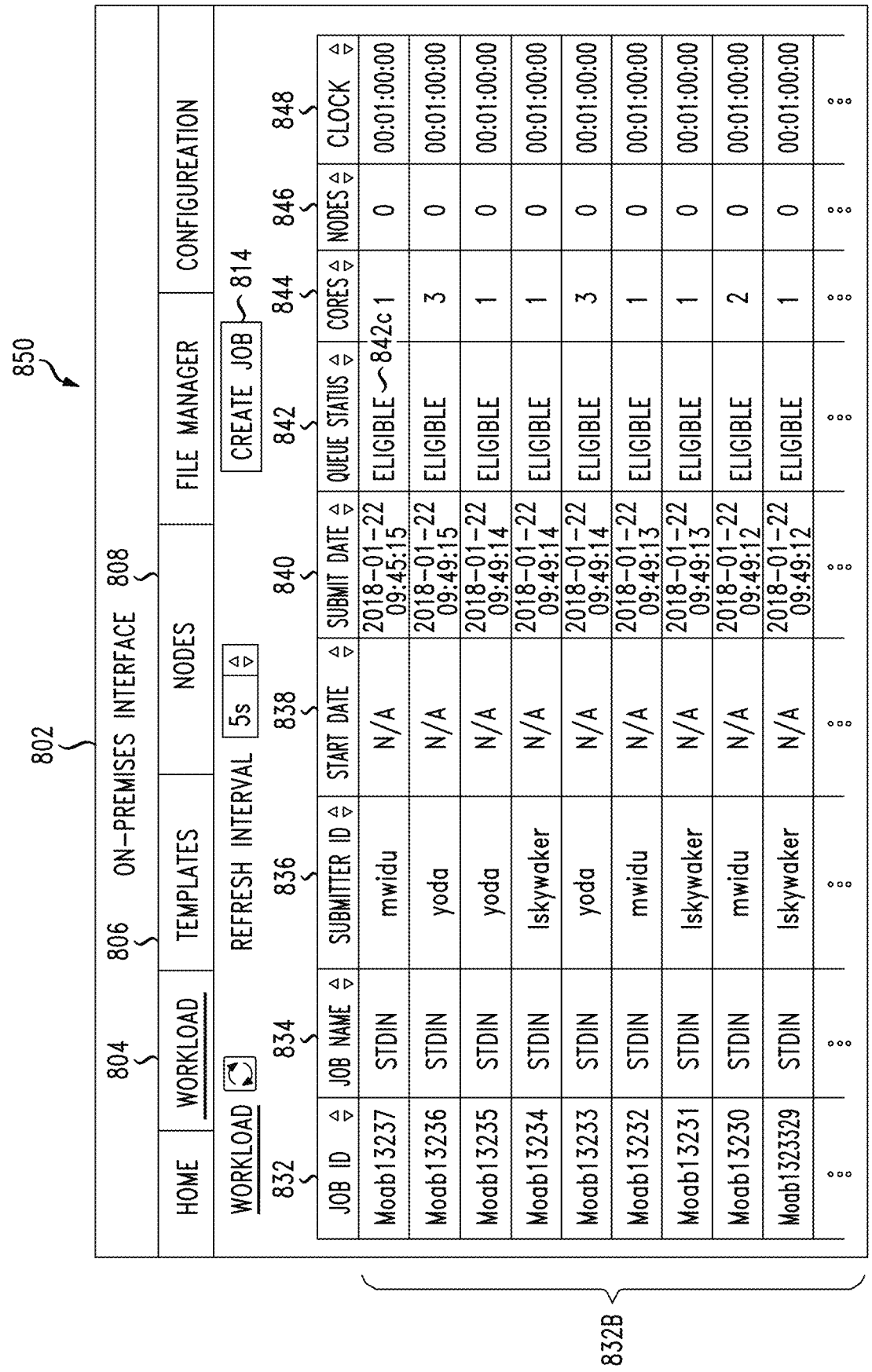

Referring to FIG. 8C, view 850 in the on-premises interface 802 illustrates different jobs (832B) in the workload screen having an eligible status 842C in the queue status column (842). Jobs 832B in this example represent jobs in the queue that are not active but are eligible for processing, bursting, provisioning, etc. Jobs 832B in view 850 are in addition to the jobs 832A shown in view 830 that are active (842A) or blocked (842B).

As illustrated in view 850, the number of jobs 832B that are eligible (842C) and need to be processed is large. Depending on the triggers associated with the jobs 832B and/or on-premises site 212, this can trigger provisioning and bursting onto one or more clouds 202-210, as previously described, in order to speed up the processing of these jobs and reduce the queue, thus mitigating or avoiding potential violations (e.g., SLA, QoS, etc.). For example, if the number of the jobs 832 exceeds a threshold backlog or are estimated to violate one or more requirements, such as SLA or QoS guarantees, a configured trigger can automatically initiate a process for provisioning and bursting onto one or more clouds, as previously described, to mitigate or avoid the backlog or violations.

In some cases, a user can also manually initiate a provisioning/bursting process to one or more clouds (202-210) to reduce the queue or increase performance. For example, the user can initiate a provisioning and bursting process manually for processing a certain amount of jobs as desired.

Referring to FIG. 8D, view 860 illustrates the screen on the nodes tab (808) of the on-premises interface 802 after bursting nodes 412 from cloud 202. Line 862 illustrates the nodes 412 from cloud 202, shown in the cloud provider interface 820, being moved to the on-premises interface 802 to indicate that the nodes 412 from cloud 202 have been provisioned according to the approaches described herein to process jobs or workloads for the on-premises site 212. The provisioning and bursting represented by line 862 can be triggered automatically based on one or more triggers, as previously described, and performed by the multi-cloud bursting service 340A using the stack and job templates (e.g., 600, 650) defined for the clouds 202-210.

As illustrated in view 860, the nodes depicted in the on-premises interface 802 for processing jobs at the on-premises site include a combination of on-premises nodes 262 and cloud nodes 412 from cloud 202. The on-premises nodes 262 and cloud nodes 412 can work together to process jobs for the on-premises site 212 and appear as though they are all nodes on the on-premises site 212.

The on-premises nodes 262 and cloud nodes 412 in this example include a busy status 866 and a down status 864, as indicated in the status column 810B. The nodes 412 are shown as having a 99% TTL (868), indicating that the nodes 412 have only gone through a small portion of the TTL configured for the nodes 412 before they are purged.

Figure 8E:
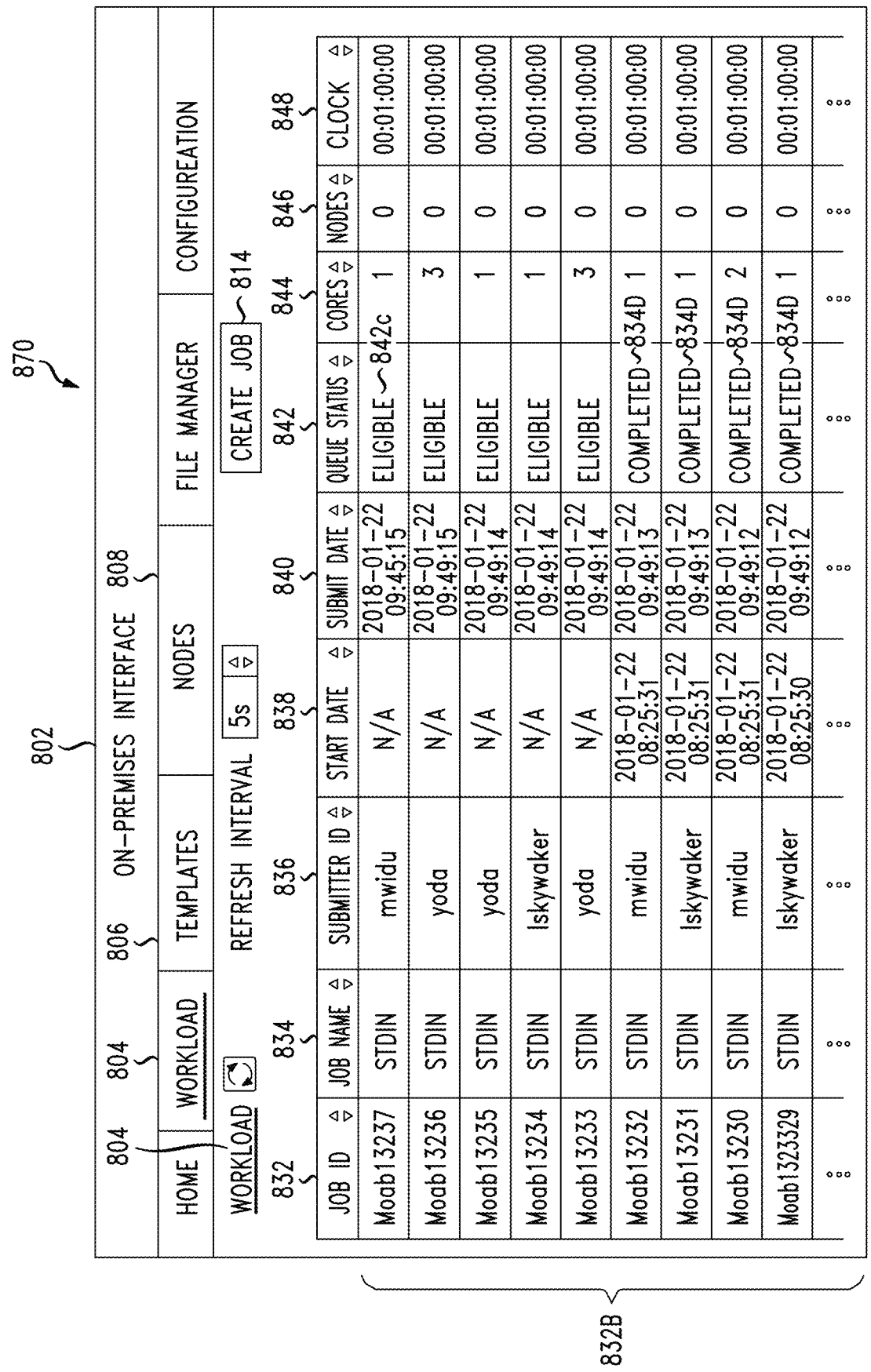

Referring to FIG. 8E, view 870 illustrates a portion of the jobs in the workload screen from the workload tab (804) of the on-premises interface 802 now transitioned to a completed status 834D. The queue in the on-premises site 212 as starting to reduce as more jobs are being processed after the nodes 412 from cloud 202 were provisioned to assist with eligible jobs in the on-premises site 212. This represents improvements in the processing, performance, etc., of jobs in the on-premises site 212 and the benefits of the automatic bursting onto the cloud 202.

Referring to view 880 in FIG. 8F, after some time processing jobs, the nodes 412 provisioned from cloud 202 have now reached an idle status 868, indicating that their corresponding jobs have been processed or completed. The completion of such jobs would have a significant impact on the queue of jobs or workloads at the on-premises site 212 and the performance of submitted jobs or workloads. The nodes 262 at the on-premises site 212 should have a much lower burden and may be capable of handling the remaining jobs in the queue (e.g., 258) at the on-premises site 212 without necessarily relying on, or utilizing, nodes from cloud 202 or other clouds.

As shown in view 880, the provisioned nodes 412 from the cloud 202 have remaining TTL before they will be automatically purged. To reduce cost, a user may manually purge (e.g., deprovision, retire, destroy) one or more of the nodes 412 from the cloud 202 to save costs that may be incurred based on reservation time. In some cases, the system may also have a trigger to automatically purge the nodes 412 once the queue or backlog has been eliminated or reduced to a certain level despite another purge trigger (e.g., TTL) not being yet met. Thus, the purging process can include multiple purge triggers that can work together to optimize the reservation and usage of resources and purging of unneeded resources.

Figure 9:
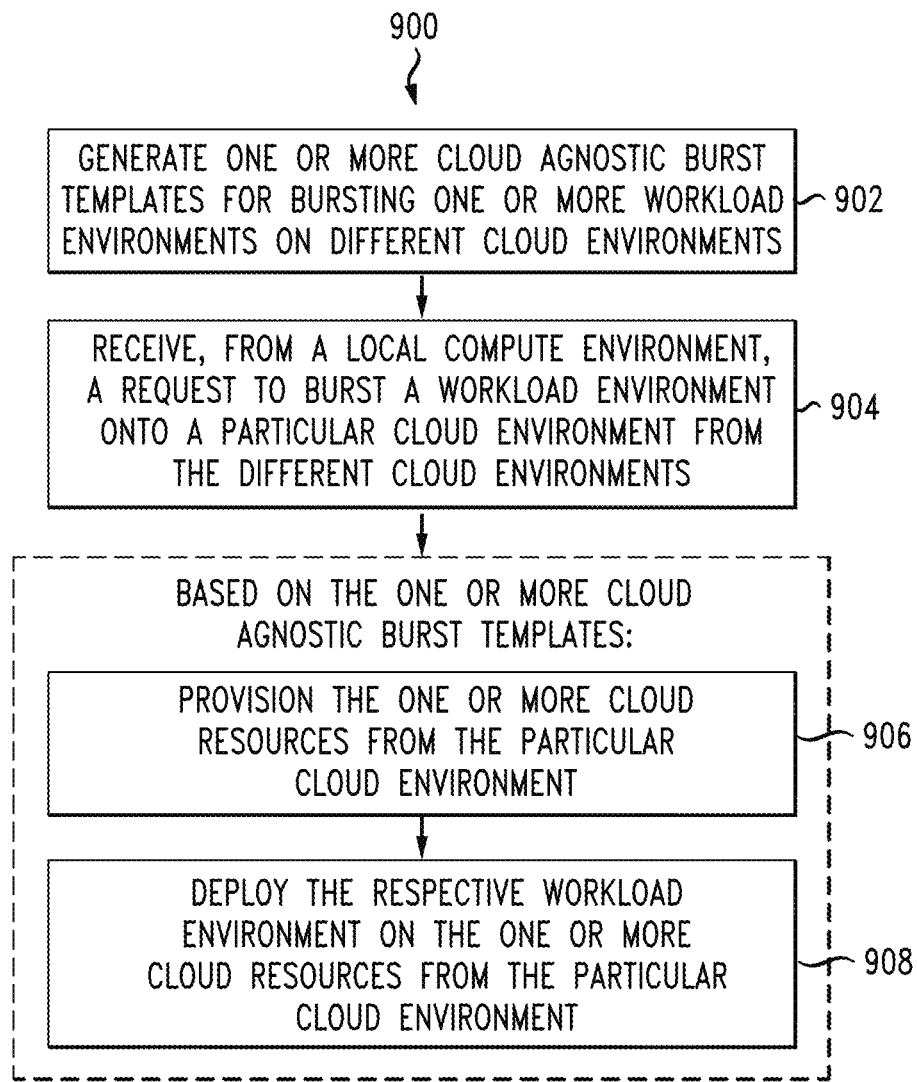
FIG. 9 illustrates an example method for cloud bursting across clouds in a cloud agnostic manner, in accordance with various aspects of the disclosure.

Having disclosed example system components and concepts, the disclosure now turns to the example method 900 shown in FIG. 9. For the sake of clarity, the method 900 is described in terms of cloud computing environment 200, as shown in FIG. 2A, and multi-cloud bursting service 340A, as shown in FIG. 4. The steps outlined herein are examples provided for explanation and can be implemented in any combination thereof, including combinations that exclude, add, or modify certain steps.

At block 902, multi-cloud bursting service 340A can generate and/or store one or more cloud agnostic burst templates (e.g., 406) for bursting one or more workload environments on different clouds (e.g., 202-210). Each cloud agnostic burst template can include a stack template (e.g., 600) and/or a job template (e.g., 650). Moreover, each cloud agnostic burst template can define a stack for a workload environment and tasks (e.g., 610-620) for provisioning one or more cloud resources (e.g., cloud nodes 412, 414, 416, 418, and/or 420) and deploying, on the one or more cloud resources, the workload environment associated with the stack.

The stack can include or define one or more applications, one or more libraries, one or more services, an OS (e.g., a base OS for the workload environment), and/or data (e.g., files, packages, data blocks, etc.). The stack can be used to generate the workload environment or an image of the workload environment. In some examples, the workload environment can be an execution environment, which can include an OS, one or more applications, one or more libraries, one or more services, data, etc. For example, the workload can be a server environment, a VM, a software container, a software package, an application or service, etc.

At block 904, multi-cloud bursting service 340A can receive from a local compute environment (e.g., on-premises site 212), a request (e.g., 404) to burst a workload environment onto a cloud (e.g., 202) from the different clouds (e.g., 202-210). The request to burst the workload environment can be for provisioning resources, such as nodes, and processing a submitted workload or job request at the local compute environment. Moreover, the request can be generated in response to a specified trigger (e.g., 402). For example, a cloud bursting request for reserving or allocating cloud resources for a job can be generated in response to a trigger specifying that such request is to be issued when a backlog reaches a threshold (e.g., x number of backlog jobs), when a workload queue (e.g., 258) reaches a threshold size, when a capacity at the local compute environment or a number of active or available resources reaches a threshold, when a policy violation is detected (e.g., QoS violation, SLA violation, performance requirement, security requirement, reliability requirement, etc.), when a limit is reached (e.g., a maximum latency, a maximum acceptable job processing or completion time, a maximum average performance degradation, etc.), when a spike is encountered, when an error or failure is encountered, when a capacity is deemed insufficient, etc.

The request from the local compute environment can specify a job or workload associated with the request, and may indicate that one or more resources (e.g., cloud nodes) need to be provisioned for the job or workload. In some examples, the request may also specify what cloud is to be used for provisioning the requested resources. The request may also specify other parameters, such as a timeout parameter, a cost parameter, a performance requirement, a job priority, a QoS requirement, a SLA, a reservation time for the requested resources, a bursting budget, a purge time or condition (e.g., a job TTL, a resource idle time that should trigger purging, an indication that a resources should be purged upon completion of a job or an increase of available resource at the local compute environment, etc.), a type and/or number of cloud instances for bursting, a variable or value to be used for the bursting, etc.

Based on the cloud agnostic burst templates, at block 906, multi-cloud bursting service 340A provisions (e.g., 410) the cloud resources (e.g., cloud nodes 412) from the cloud (e.g., 202), and at block 908 multi-cloud bursting service 340A deploys the workload environment on the cloud resources. For example, multi-cloud bursting service 340A can use the cloud agnostic burst template, which defines a stack for the workload environment and tasks for provisioning the workload environment, to reserve the cloud resources, create an image of the workload environment and deploy it on the cloud resources. Thus, the cloud agnostic burst template can define the necessary provisioning tasks and dependencies.

In some cases, the tasks can provide instructions (e.g., commands) and/or scripts for reserving nodes; obtaining the necessary data (e.g., files, packages, etc.) for the provisioning; install the necessary OS, applications, libraries, tools, configuration files, services, execution scripts, etc.; configuring the OS, applications, services, and/or overall environment; launch a cloud instance with the workload environment; and configure the instance to process jobs or workloads for the local compute environment.

The bursting described at blocks 906 and 908 can be implemented using stack and/or job definitions, such as stack template 600 and job template 650, for automating the process. The stack and job template(s) can be in a single file, such as a single cloud agnostic bursting template file, or multiple files, such as multiple cloud agnostic bursting template files. For example, the stack and job templates can be in different JSON files defined for bursting across multiple cloud providers, which may run different cloud solutions, platforms, configurations, architectures, resources, etc. In some cases, the cloud agnostic bursting template can include a stack and/or job definition in one or more files and include references to other files or objects used in the process, such as scripts, packages, directories, mounts, utilities, executable code, etc.

The tasks defined for the bursting in the stack and job definitions can be translated by multi-cloud bursting service 340A into commands for provisioning the cloud resources from the specific cloud and launching the cloud instance(s) (e.g., workload environment) on the provisioned cloud resources. The translated commands can be specific to the cloud provider selected for bursting. As previously mentioned, different cloud providers run different clouds (e.g., 202-210) which may run different cloud solutions and have different configurations, platforms, resources, architecture, programming languages, execution environments, requirements, or other characteristics. Accordingly, the commands, software (e.g., applications, OS, programming languages, utilities, etc.), libraries, hardware configurations, protocols, syntax, dependencies, etc., for provisioning/bursting can vary between cloud provider (e.g., clouds 202-210). Multi-cloud bursting service 340A can thus use the cloud agnostic bursting templates to define (or abstract) the provisioning/bursting tasks and dependencies, and perform a translation process to generate the commands, configurations, etc., suitable for provisioning/bursting at the specific clouds (202-210) in view of the aforementioned distinctions between cloud providers.

Once the bursting request is completed and the cloud instances are launched, the specific jobs or workloads can be processed via the provisioned cloud resources for the local compute environment. In some cases, the provisioned resources can work along with local resources as if the cloud and local resources are part of the local compute environment. For example, the provisioned cloud resources can be added to a cluster (e.g., 260A) of nodes on the local compute environment, and together operate and appear as a single cluster of local nodes. The local compute environment can view and manage the jobs or workloads as well as the local and cloud nodes from a graphical user interface (e.g., 802). Through the graphical user interface, a user can add or remove cloud nodes, add or modify templates, release resources or instances, start or stop jobs, manage the local workload queue, configure bursting configurations, etc. The multi-cloud bursting service 340A can communicate with the local compute environment and the various clouds (e.g., 202-210) to coordinate information, requests, and operations, including orchestration or resources and scheduling of jobs. The multi-cloud bursting service 340A can communicate with the various clouds and/or the local compute environment through an API, for example.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments are part of the scope of this disclosure. For instance, while the principles disclosed herein are generally discussed in terms of a public cloud, a private cloud 412 can also receive workloads from a private multi-cloud bursting service. The principles herein are applicable to all cloud compute environments. Those skilled in the art will readily recognize various modifications and changes that may be made to the principles described herein without following the example embodiments and applications illustrated and described herein, and without departing from the spirit and scope of the disclosure.

What is claimed is:

1. A method comprising:
   generating one or more cloud agnostic burst templates for bursting one or more workload environments on different cloud environments, each of the one or more cloud agnostic burst templates defining:
      a respective stack for a respective workload environment, the respective stack comprising at least one of one or more applications, one or more libraries, one or more services, and an operating system, the respective stack further comprising data to be processed by the one or more applications; and
      one or more tasks for provisioning one or more cloud resources and deploying, on the one or more cloud resources, the respective workload environment associated with the respective stack;
   receiving, at a multi-cloud bursting service, from a local compute environment, a request to burst the respective workload environment onto a particular cloud environment from the different cloud environments; and
   based on the one or more cloud agnostic burst templates:
      provisioning, via the multi-cloud bursting service, the one or more cloud resources from the particular cloud environment; and
      deploying, via the multi-cloud bursting service, the respective workload environment on the one or more cloud resources from the particular cloud environment.

2. The method of claim 1, further comprising adding the one or more cloud resources to a cluster of resources on the local compute environment, the cluster of resources comprising the one or more cloud resources from the particular cloud environment and one or more resources from the local compute environment.

3. The method of claim 2, wherein the one or more cloud resources from the particular cloud environment and one or more resources from the local compute environment comprise a set of nodes from the particular cloud environment and the local compute environment, the set of nodes comprising at least one of a storage node, a compute node, and a network node.

4. The method of claim 3, further comprising generating a graphical user interface identifying the set of nodes from the particular cloud environment and the local compute environment, jobs assigned to the set of nodes, and a respective status of each job.

5. The method of claim 4, wherein the graphical user interface identifies a respective queue status of each of a plurality of jobs on the local compute environment and a respective job identifier associated with each of the plurality of jobs, the plurality of jobs comprising at least a portion of the jobs assigned to the set of nodes.

6. The method of claim 1, wherein provisioning the one or more cloud resources and deploying the respective workload environment on the one or more cloud resources are based on the respective stack and the one or more tasks, the method further comprising:
   launching, on the one or more cloud resources, at least one instance of the respective workload environment; and
   assigning one or more jobs to the at least one instance of the respective workload environment on the one or more cloud resources.

7. The method of claim 1, wherein provisioning the one or more cloud resources and deploying the respective workload environment on the one or more cloud resources comprise translating the one or more tasks into one or more commands defined for the particular cloud environment based at least partly on at least one of a configuration or a characteristic of the particular cloud environment, the one or more commands being executable for provisioning the one or more cloud resources and deploying the respective workload environment at the particular cloud environment.

8. The method of claim 1, wherein the one or more tasks comprise executable instructions for at least one of uploading one or more files associated with the respective stack to one or more locations, requesting the one or more cloud resources for provisioning, installing at least one of the one or more applications and libraries, and configuring at least one of the one or more applications, the one or more services, the one or more cloud resources, and the respective workload environment.

9. The method of claim 8, wherein the one or more cloud agnostic templates are associated with one or more job definitions associated with one or more jobs, the one or more job definitions specifying, for each job, at least one of a respective job identifier, a stack identifier corresponding to a stack for the job, and one or more parameters associated with the job.

10. The method of claim 9, wherein the one or more parameters specify at least one of a trigger for provisioning one or more cloud nodes for the job, a type of cloud instance for the job, a number of cloud instances for the job, a number of cloud nodes to request for the job, a number of processors for each cloud node, and one or more job policies.

11. The method of claim 10, wherein the one or more job policies comprise at least one of a quality of service, a node or resource usage limit, a cloud bursting limit, and a purge condition defining at least one of a time-to-live and a node idle purge time, the trigger comprising at least one of a threshold backlog, a threshold resource availability, a policy violation, and a threshold condition.

12. A system comprising:
   one or more processors; and
   at least one non-transitory computer-readable storage medium storing instructions which, when executed by the one or more processors, cause the system to:
      generate one or more cloud agnostic burst templates for bursting one or more workload environments on different cloud environments, each of the one or more cloud agnostic burst templates defining:
         a respective stack for a respective workload environment, the respective stack comprising at least one of one or more applications, one or more libraries, one or more services, and an operating system, the respective stack further comprising data to be processed by the one or more applications; and
         one or more tasks for provisioning one or more cloud resources and deploying, on the one or more cloud resources, the respective workload environment associated with the respective stack;
      receive, from a local compute environment, a request to burst the respective workload environment onto a particular cloud environment from the different cloud environments; and
      based on the one or more cloud agnostic burst templates:
         provision the one or more cloud resources from the particular cloud environment; and
         deploy the respective workload environment on the one or more cloud resources from the particular cloud environment.

13. The system of claim 12, the non-transitory computer-readable storage medium storing instructions which, when executed by the one or more processors, cause the system to:
add the one or more cloud resources to a cluster of resources on the local compute environment, the cluster of resources comprising the one or more cloud resources from the particular cloud environment and one or more resources from the local compute environment.

14. The system of claim 13, wherein the one or more cloud resources from the particular cloud environment and one or more resources from the local compute environment comprise a set of nodes from the particular cloud environment and the local compute environment, the set of nodes comprising at least one of a storage node, a compute node, and a network node.

15. The system of claim 14, the non-transitory computer-readable storage medium storing instructions which, when executed by the one or more processors, cause the system to:
generate a graphical user interface identifying the set of nodes from the particular cloud environment and the local compute environment, jobs assigned to the set of nodes, and a respective status of each job.

16. The system of claim 12, wherein provisioning the one or more cloud resources and deploying the respective workload environment on the one or more cloud resources are based on the respective stack and the one or more tasks, the non-transitory computer-readable storage medium storing instructions which, when executed by the one or more processors, cause the system to:
launch, on the one or more cloud resources, at least one instance of the respective workload environment; and
assign one or more jobs to the at least one instance of the respective workload environment on the one or more cloud resources.

17. A non-transitory computer-readable storage medium comprising:
instructions stored thereon which, when executed by one or more processors, cause the one or more processors to:
generate one or more cloud agnostic burst templates for bursting one or more workload environments on different cloud environments, each of the one or more cloud agnostic burst templates defining:
a respective stack for a respective workload environment, the respective stack comprising at least one of one or more applications, one or more libraries, one or more services, and an operating system, the respective stack further comprising data to be processed by the one or more applications; and
one or more tasks for provisioning one or more cloud resources and deploying, on the one or more cloud resources, the respective workload environment associated with the respective stack;
receive, from a local compute environment, a request to burst the respective workload environment onto a particular cloud environment from the different cloud environments; and
based on the one or more cloud agnostic burst templates:
provision the one or more cloud resources from the particular cloud environment; and
deploy the respective workload environment on the one or more cloud resources from the particular cloud environment.

18. The non-transitory computer-readable storage medium of claim 17, wherein provisioning the one or more cloud resources and deploying the respective workload environment on the one or more cloud resources comprise translating the one or more tasks into one or more commands specifically for the particular cloud environment based on at least one of a configuration or a characteristic of the particular cloud environment, the one or more commands being executable for provisioning the one or more cloud resources and deploying the respective workload environment at the particular cloud environment.

19. The non-transitory computer-readable storage medium of claim 18, wherein the one or more tasks defined in the one or more cloud agnostic templates comprise executable instructions for at least one of uploading one or more files associated with the respective stack to one or more locations, requesting the one or more cloud resources, installing at least one of the one or more applications and libraries, and configuring at least one of the one or more applications, the one or more services, the one or more cloud resources, and the respective workload environment.

20. The non-transitory computer-readable storage medium of claim 19, wherein the one or more cloud agnostic templates comprises one or more job templates associated with one or more respective jobs, the one or more job templates defining, for each job, at least one of a respective job identifier, a stack identifier associated with a stack for the job, and one or more parameters, wherein the one or more parameters specify at least one of a trigger for provisioning one or more cloud nodes for the job, a type of cloud instance to burst for the job, a number of cloud instances to burst for the job, a number of cloud nodes to request for the job, a number of processors for each cloud node, and one or more job policies comprising at least one of usage policies and purge policies.

* * * * *